US010434940B1

(12) United States Patent
Verduzco Ochoa

(10) Patent No.: US 10,434,940 B1
(45) Date of Patent: Oct. 8, 2019

(54) ACTIVE CEILING DISPLAY SYSTEM IN VEHICLE

(71) Applicant: ALPINE ELECTRONICS, INC., Tokyo (JP)

(72) Inventor: Oscar Eduardo Verduzco Ochoa, Playa Vista, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 16/259,493

(22) Filed: Jan. 28, 2019

(51) Int. Cl.
*B60Q 3/00* (2017.01)
*B60Q 3/85* (2017.01)
*B60Q 3/51* (2017.01)
*B60Q 3/82* (2017.01)
*B60R 11/00* (2006.01)
*B60R 21/015* (2006.01)
*G06F 3/041* (2006.01)

(52) U.S. Cl.
CPC ............... *B60Q 3/85* (2017.02); *B60Q 3/51* (2017.02); *B60Q 3/82* (2017.02); *B60R 21/015* (2013.01); *B60R 2011/0028* (2013.01); *G06F 3/0416* (2013.01)

(58) Field of Classification Search
CPC .......... B60Q 3/00; B60Q 3/85; B60R 21/015; G06F 3/0416; G06F 3/0484; G06F 3/0488
USPC ............................. 315/77; 307/10.1; 345/173
See application file for complete search history.

(56) References Cited

U.S. PATENT DOCUMENTS

| 7,084,859 B1 * | 8/2006 | Pryor ................. G01C 21/3664 345/156 |
| 9,617,014 B2 | 4/2017 | Abel |
| 9,674,929 B2 | 6/2017 | Paradiso et al. |
| 2007/0262574 A1 * | 11/2007 | Breed ....................... B60R 1/00 280/735 |
| 2014/0309871 A1 * | 10/2014 | Ricci ........................ B60Q 1/00 701/36 |

FOREIGN PATENT DOCUMENTS

| JP | 2005-228566 | 8/2005 |
| JP | 2006-100216 | 4/2006 |
| JP | 2013-008461 | 1/2013 |

(Continued)

OTHER PUBLICATIONS

"Farralane.com—Acclaim Lighting Catwalk Panel LED Interactive Touch Panel", posted Mar. 16, 2012, see at 1:07, site visited Mar. 29, 2019, retrieved from internet, <https://www.youtube.com/watch?v=R10_4ciWxgl>.

(Continued)

*Primary Examiner* — Thuy V Tran
(74) *Attorney, Agent, or Firm* — Knobbe Martens Olson & Bear LLP

(57) ABSTRACT

Systems and methods for providing active ceiling display on the ceiling of a vehicle that is manipulated by occupant gestures. A display provides an area of illumination that illuminates at least a portion of the interior of a vehicle. The occupant manipulates aspects of the area of illumination with gestures. The system causes an area of illumination to follow the movements of an occupant. The system changes aspects of illumination within the vehicle based on the activities of an occupant, mood of the occupants, and ambient lighting inside and outside the vehicle.

21 Claims, 21 Drawing Sheets

(56) References Cited

FOREIGN PATENT DOCUMENTS

WO WO 2016/134732 9/2016

OTHER PUBLICATIONS

"Interactive LED Panels for LED Table—Powered by Arduino", posted Jul. 9, 2016, see at 0:49, site visited Mar. 29, 2019, retrieved from internet, <https://www.youtube.com/watch?v=UAYObehfCTU>.

"[#1-Part1] Building—Interactive 100-pixel WS2812/WS2811 RGB LED-table—Arduino | LedON", posted Mar. 23, 2016, see at 3:43, site visited Mar. 29, 2019, retrieved from internet, <https://www.youtube.com/watch?v=qYL9GYsOQjo>.

"OmiSky Interactive Ceiling Projection System", posted Apr. 30, 2015, see at 0:12, site visited Mar. 29, 2019, retrieved from internet, <https://www.youtube.com/watch?v=KJFJTHhUUNs>.

\* cited by examiner

# ACTIVE CEILING DISPLAY SYSTEM IN VEHICLE

TECHNICAL FIELD

This disclosure relates to active ceiling display systems and methods for providing illumination on the ceiling of a vehicle that is controlled by occupant gestures.

BACKGROUND

In-vehicle lighting has not significantly changed since its first implementation more than 60 years ago. Currently, vehicles have static positioned lights fixed to the ceiling of a vehicle that are primarily used for aiding in visibility when there is inadequate light. These static positioned lights are often positioned far from where the occupant needs them to be and may be inadequate sizes, colors, and/or shapes. A static positioned light may be able to increase in brightness to illuminate the entire interior of a vehicle so an occupant has improved visibility, but this may bother other occupants of the vehicle or even impair the visibility of the driver.

SUMMARY

Systems and methods are disclosed related to active ceiling display systems in a vehicle. In some embodiments, an active ceiling display system controls illumination on the ceiling of a vehicle. The system determines occupant gestures and, in response to those gestures, provides illumination on a display located on the ceiling of the vehicle. In response to an occupant's gestures, the system can provide an area of illumination at any location on the display and with varying sizes, shapes, color, and/or brightness. In response to occupant gestures, the system can move an area of illumination to a different location on the display. In some embodiments, the system determines brightness and/or color of ambient light and adjusts illumination inside the vehicle based on the determined brightness and/or color of ambient light. In some embodiments, the illumination provided on the display is media content, such as a movie. In some embodiments, the illumination provided on the display is the graphical user interface of a video game.

One general aspect includes a system for providing illumination on a display disposed on a ceiling of a vehicle that is controlled by gestures of one or more occupants. The system can include a display interface that is configured to operatively connect to a display that is disposed on the ceiling of a vehicle. The system can include a display controller that is connected to the display interface and is configured to generate electronically-encoded display instructions that cause the display to provide illumination inside the vehicle. The system can include a sensor interface that is configured to operatively connect to a sensor, and the sensor can be configured to sense a location of an occupant of the vehicle. The system can also include a hardware processor that is connected to a physical memory system that has instructions. The instructions, when executed by the hardware processor, can be configured to cause the system to receive sensor input from that sensor interface that is indicative of a gesture of one or more occupants of the vehicle to control illumination within the vehicle. The instructions, when executed by the hardware processor, can be configured to interpret the sensor input to determine an illumination control operation that is associated with the gesture of the occupant. The instructions, when executed by the hardware processor, can be configured to cause the display to effectuate the illumination control operation. In some embodiments, the instructions, when executed by the hardware processor, can be configured to cause the system to distinguish between multiple occupants and the gestures of such occupants, and associate areas of illumination and illumination control operations respective to each occupant.

Implementations may include one or more of the following features. The instructions, when executed by the hardware processor, can be configured to cause the system to determine that the occupant touched the display at a touch position. In response to determining that the occupant touched the display, the system can generate, via the display controller, display commands that are configured to cause the display to provide an area of illumination at the position where the occupant touched on the display. In some embodiments, the area of illumination created is an oval shape.

The instructions, when executed by the hardware processor, can be configured to cause the system to determine that the occupant tapped the display at the area of illumination on the display. In response to determining that the occupant tapped the display, the system can generate, via the display controller, display commands that are configured to change a shape of the area of illumination.

The instructions, when executed by the hardware processor, can be configured to cause the system to determine that the occupant double-tapped the display at the area of illumination. In response to determining that the occupant double-tapped the display, the system can generate, via the display controller, display commands that are configured to cause the area of illumination to have a rectangular shape. This can include a square shape.

The instructions, when executed by the hardware processor, can be configured to cause the system to determine that the occupant triple-tapped the display at the area of illumination. In response to determining that the occupant triple-tapped the display, the system can generate, via the display controller, display commands that are configured to cause the area of illumination to have a triangular shape.

The instructions, when executed by the hardware processor, can be configured to cause the system to determine that the occupant performed a dragging gesture beginning within the area of illumination and ending at a new touch position on the display. In response to determining that the occupant performed a dragging gesture beginning within the area of illumination and ending at a new touch position on the display, the system can generate, via the display controller, display commands causing the area of illumination to move to the new touch position. In some embodiments, the display controller is configured to generate display commands causing the area of illumination to follow the dragging gesture of the occupant.

The instructions, when executed by the hardware processor, can be configured to cause the system to determine that the occupant performed a flicking gesture beginning within the area of illumination and having a flick direction. In response to determining that the occupant performed a flicking gesture beginning within the area of illumination, the system can generate, via the display controller, display commands that are configured to cause the area of illumination to move in the flick direction. In some embodiments, the instructions, when executed by the hardware processor, can be configured to cause the system to determine a flick speed of the flicking gesture. In response to determining the flick speed of the flicking gesture, the system can generate, via the display controller, display commands that are configured to move the area of illumination a movement distance proportional to the flick speed.

The instructions, when executed by the hardware processor, can be configured to cause the system to determine that the occupant performed a pinching gesture beginning within the area of illumination. In response to determining that the occupant performed a pinching gesture beginning within the area of illumination, the system can generate, via the display controller, display commands that are configured to change a size of the area of illumination.

The instructions, when executed by the hardware processor, can be configured to cause the system to determine that the occupant performed a rotation gesture within the area of illumination. In response to determining that the occupant performed a rotation gesture within the area of illumination, the system can generate, via the display controller, display commands that are configured to change a color and/or brightness of the area of illumination.

The instructions, when executed by the hardware processor, can be configured to cause the system to determine that the occupant performed a drawing gesture creating a trace path. In response to determining that the occupant performed a drawing gesture creating a trace path, the system can generate, via the display controller, display commands that are configured to illuminate the trace path.

In some embodiments, the sensor can be configured to sense ambient light inside and/or outside the vehicle. In some embodiments, the instructions, when executed by the hardware processor, can be configured to cause the system to determine a brightness of ambient light inside and/or outside the vehicle. In response to determining the brightness of ambient light inside and/or outside the vehicle, the system can generate, via the display controller, display commands that are configured to change a brightness of the illumination. In some embodiments, the instructions, when executed by the hardware processor, can be configured to cause the system to determine a color of ambient light inside and/or outside the vehicle. In response to determining the color of ambient light inside and/or outside the vehicle, the system can generate, via the display controller, display commands that are configured to change a color of the illumination.

In some embodiments, the display is a flexible mesh of light-emitting diodes that is operatively connected to the roof of the vehicle.

The instructions, when executed by the hardware processor, can be configured to cause the system to determine that the occupant touched the display and determine an initial position of the occupant. The system can determine that the occupant moved from the initial position to a new position within the vehicle, and in response to determining that the occupant moved to the new position, the system can generate, via the display controller, display commands that are configured to move the area of illumination such that the area of illumination illuminates the new position of the occupant.

The instructions, when executed by the hardware processor, can be configured to cause the system to generate, via the display controller, display commands configured to cause the display to provide a diffuse light pattern.

The instructions, when executed by the hardware processor, can be configured to cause the system to determine that the occupant is not secured by a seatbelt. In response to determining that the occupant is not secured by a seatbelt, the system can generate, via the display controller, display commands that are configured to cause the display to provide an alert.

BRIEF DESCRIPTION OF THE DRAWINGS

Certain embodiments will now be described with reference to the following drawings. Throughout the drawings, reference numbers may be re-used to indicate correspondence between referenced elements. The drawings are provided to illustrate example embodiments described herein and are not intended to limit the scope of the disclosure or the claims.

DETAILED DESCRIPTION OF EMBODIMENTS

Figure 1:
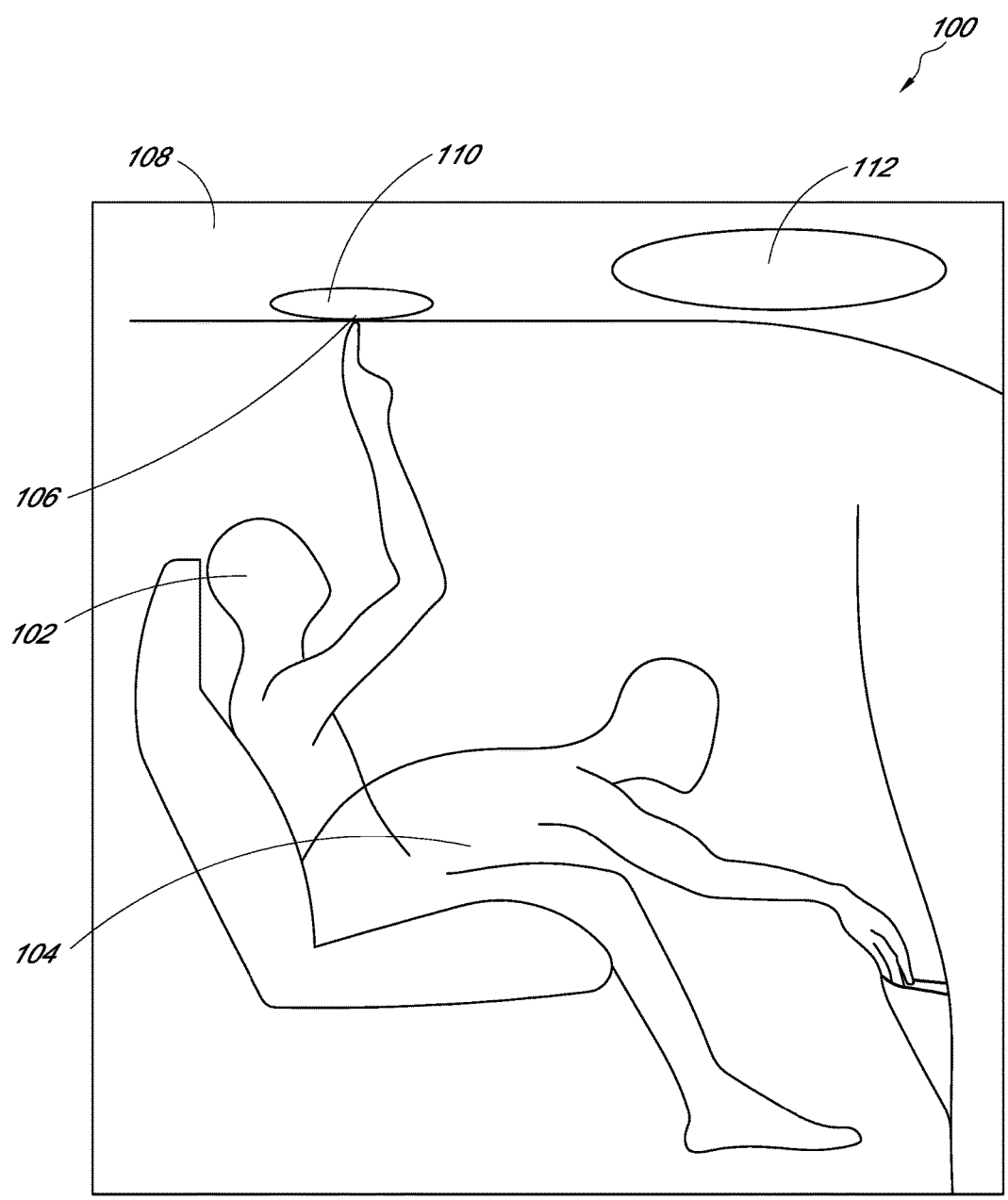
FIG. 1 illustrates an example of an active ceiling display system being controlled by occupant gestures.

This disclosure presents various embodiments of systems and methods related to providing illumination inside a vehicle with an active ceiling display system controlled by occupant gestures. The disclosure presents various embodiments of systems and methods related to providing illumination on a display disposed on the ceiling of a vehicle. The shape, color, size, location, and other aspects of the illumination can be controlled by occupant gestures and/or ambient light inside and/or outside the vehicle.

Providing sufficient illumination inside of a vehicle can be challenging because in-vehicle lighting is static. An occupant could require illumination at a different location from the statically positioned light source inside the vehicle. Some embodiments provide that an occupant can control the shape, color, size, location, and other aspects of the illumination inside the vehicle with gestures. Some embodiments provide that an area of illumination follows the occupant without requiring intentional gesture controls by the occupant. As used herein, an area of illumination encompasses an active region of the display primarily used to supply light to the vehicle's cabin or a portion of the cabin rather than to display media content intended for direct viewing. An area of illumination can have various shapes, sizes, colors, or other design features, as described in detail hereinafter.

Providing proper illumination inside of a vehicle can be challenging because changing ambient light inside and/or outside the vehicle can require different illumination inside of the vehicle. Some embodiments provide that the active ceiling display system can provide illumination inside the vehicle based on the detected brightness and/or color of ambient light inside and/or outside the vehicle. In some embodiments, this can help prevent the driver's visibility of outside the vehicle from being limited by lights illuminating the inside of the vehicle.

Some embodiments provide illumination inside of a vehicle based on the determined mood of the occupants of the vehicle and/or the brightness and/or color of detected ambient light inside and/or outside the vehicle. This would provide appropriate illumination inside of the vehicle without requiring intentional control by an occupant. Some embodiments provide illumination inside of a vehicle based on the determined activity of the occupants of the vehicle and/or brightness and/or color of detected ambient light inside and/or outside the vehicle. This would provide appropriate illumination inside of the vehicle without requiring intentional control by an occupant.

Some embodiments provide that the illumination inside of a vehicle incorporates media content, such as, for example, content (such as text, photos or other images, or video) intended to be directly viewed by an occupant of the vehicle. In such embodiments, the system can have functionality that permits the occupant to change the shape, color, size, location, and/or other aspects of the displayed media content.

Example Active Ceiling Display

FIG. 1 is drawing depicting an example embodiment of active ceiling display 100, according to some embodiments. The drawing is provided for the purpose of facilitating description of aspects of some embodiments. The drawing does not attempt to illustrate all aspects of the disclosure and should not be considered limiting.

FIG. 1 illustrates an example of active ceiling display 100. Occupant 102 touches the display 108 disposed on the ceiling of a vehicle at a touch position 106. An area of illumination 110 is provided on the display 108 at the touch position 106. Occupant 104 is Occupant 102 at a subsequent moment in time. Occupant 104 is engaged in an activity that requires illumination, such as looking in a dark pocket on the back of a vehicle seat. Area of illumination 112 is area illumination 110 at a subsequent moment in time. Area of illumination 110 was made larger and moved over the new position of occupant 104 to become area of illumination 112 to illuminate the area being searched by occupant 104, enabling occupant 104 to better see the area being searched.

Figure 20:
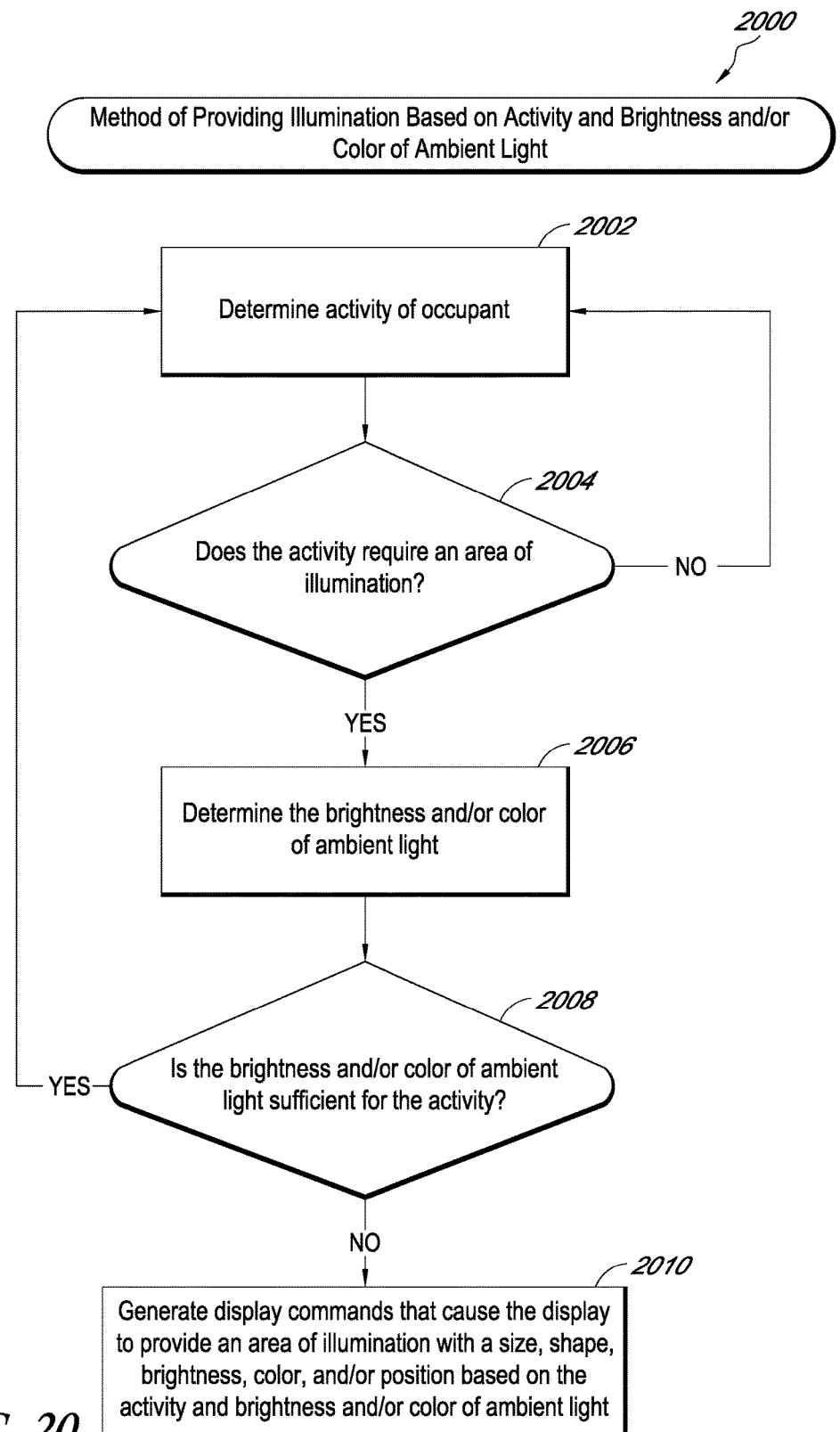
FIG. 20 illustrates an example of a method for providing illumination inside of a vehicle based on the activity of the occupant and the brightness and/or color of ambient light.

Area of illumination 110 can become area of illumination 112 that is over occupant 104 by the methods described in relation to FIG. 12, FIG. 13, FIG. 14, FIG. 18, and/or FIG. 20. Area of illumination 112, with its larger size and position over occupant 104, provides sufficient light to occupant 104.

As discussed, FIG. 1 illustrates an example embodiment of active ceiling display 100. Other embodiments can include one or more other criteria described with reference to FIG. 1. Embodiments that may omit or add to one or more features to the example active ceiling display 100 of FIG. 1 are within the scope of this disclosure.

Example System Diagram

Figure 2:
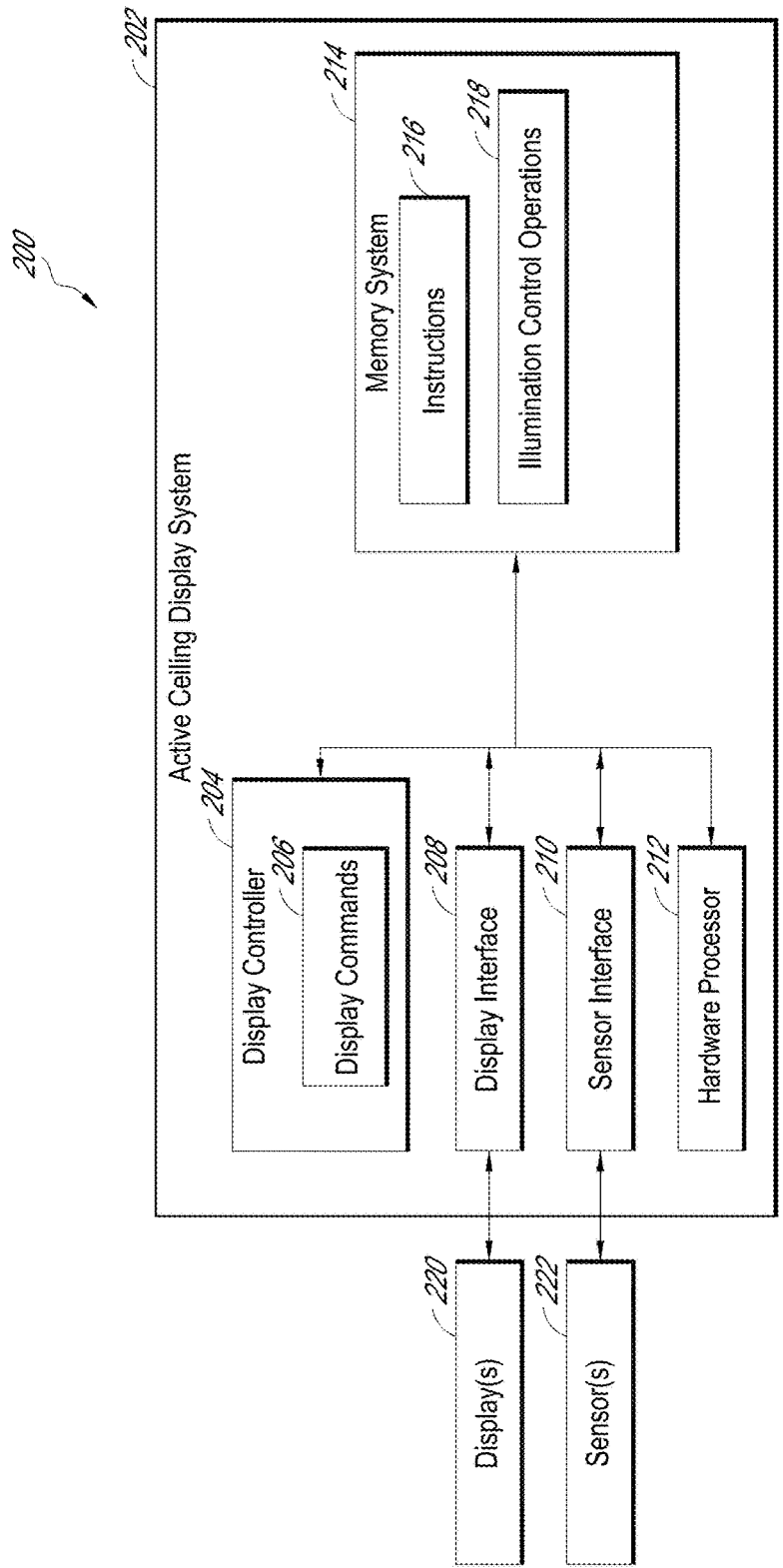
FIG. 2 is a system diagram of an example active ceiling display system.

FIG. 2 is an example system diagram of a vehicle illumination system 200, according to some embodiments. As depicted in FIG. 2, the vehicle illumination system 200 can include an active ceiling display system 202. The architecture of the active ceiling display system 202 can include an arrangement of computer hardware and software components used to implement aspects of the present disclosure. The active ceiling display system 202 may include more or fewer elements than those shown in FIG. 2. It is not necessary, however, that all of these elements be shown in order to provide an enabling disclosure. In some embodiments, the active ceiling display system 202 is an example of what is referred to hereinbefore as a vehicle illumination system.

As illustrated, the active ceiling display system 202 can include a display controller 204, display interface 208, sensor interface 210, hardware processor 212, and/or memory system 214, all of which can communicate with one another by way of a data communication technique. The hardware processor 212 can read and write to memory system 214 and can execute computer program instructions 216 stored on memory system 214 to perform methods disclosed herein, including illumination control operations 218. As used herein, illumination control operations 218 encompass procedures, program code, or other logic that initiates, modifies, directs, and/or eliminates one or more areas of illumination or otherwise modifies illumination within the vehicle.

The sensor interface 210 can receive input from sensor(s) 222. Sensor(s) 222 can be one or more sensors. In some embodiments, sensor(s) 222 can be any sensor used to determine the location of an occupant in a vehicle and/or one or more limbs and/or appendages of the occupant of the vehicle. Sensor(s) 222 can be any sensor used to determine the location of an animate or inanimate object, including people and animals. Sensor(s) 222 can be any sensor used to distinguish between animate and inanimate objects. Sensor(s) 222 can be any sensor used to distinguish between different occupants of the same vehicle. Sensor(s) 222 can be any sensor used to distinguish between different occupants of the same vehicle that are interacting with the display, which can include when interacting with the display at the same time. This can facilitate the active ceiling display system 202 accommodating multiple occupants at the same time. Sensor(s) 222 can be an optic sensor, photo sensor, light sensor, video camera sensor, camera sensor, radar sensor, infrared sensor (including infrared laser mapping), thermal sensor, heat sensing sensor, laser sensor, LiDAR sensor, proximity sensor, weight sensor, capacitive sensor, ultrasonic sensor, and/or any combination of sensing systems. In some embodiments, sensor(s) 222 can be audio sensors. In some embodiments, sensor(s) 222 can include any sensor used to determine the ambient light, weather conditions, sky color or other surroundings outside of the vehicle. In some embodiments, the sensor(s) 222 can be embedded within the display(s) 220. For example, a capacitive sensor can be integrated into the display(s) 220 to recognize contacts between an occupant and the display(s) 220. The sensor interface 210 can receive input from sensor(s) 222 indicative of a gesture of an occupant of the vehicle, including but not limited to any of the gestures disclosed herein. As used herein, a gesture generally encompasses movement of a part of the body, especially of a hand or the head, that is intended to express an idea or meaning. Gestures include movements that include one or more of touching, motion, acceleration, velocity, rotation, direction, pointing, single-limb motion, multiple-limb motion, single-touch motion, multiple-touch motion, other body movements that express an idea or meaning, and/or a combination of such movements. In some embodiments, the sensor interface 210 is always receiving input from sensor(s) 222 when a vehicle is in use. In some embodiments, the sensor interface 210 only receives input from sensor(s) 222 after the active ceiling display system 202 has been activated.

The display interface 208 can output to display(s) 220. Display(s) 220 can be one or more displays. Display(s) 220 can be operatively connected to the roof of a vehicle. In some embodiments, display(s) 220 can be used as the headliner of a vehicle. Display(s) 220 can be embedded in the headliner of a vehicle. Display(s) 220 can be a flexible mesh of light-emitting diodes, electroluminescent display, liquid crystal display, plasma display, quantum dot display, organic light-emitting diode display, a fiber optic display system, a projector display system, and/or another display system or device. Display(s) 220 can provide/display areas of illumination, also referred to as spotlights, that illuminate the interior of a vehicle. In some embodiments, display(s) 220 can display media content, such as movies, shows, or other visual data. In some embodiments, display(s) 220 can display light patterns and/or diffuse light patterns. In some embodiments, display(s) 220 can display the graphical user interface of a game. Display(s) 220 can display visual content that can be viewed on a computer monitor or television screen.

The memory system 214 can contain instructions 216 that the hardware processor 212 can execute in order to implement one or more embodiments described herein. The memory system 214 can generally include RAM, ROM and/or other persistent auxiliary or non-transitory computer-readable media. The memory system 214 can store an operating system that provides computer program instructions for use by the hardware processor 212 in the general administration and operation of the active ceiling display system 202. The instructions 216, when executed by the hardware processor 212, can cause the system to receive sensor input from the sensor interface 210 indicative of a gesture from the occupant of the vehicle to control illumination within the vehicle. The instructions 216, when executed by the hardware processor 212, can cause the system to interpret the sensor input to determine an illumination control operation 218 associated with a gesture of the occupant. The instructions 216, when executed by the hardware processor 212, can cause the system to generate, via the display controller 204, display commands 206 that cause the display(s) 220 to effectuate an illumination control operation 218 associated with the sensed gesture from the occupant of the vehicle.

The memory system 214 can include illumination control operations 218. Illumination control operations 218 can contain computer instructions for causing the system to generate, via the display controller 204, display commands 206 that cause display(s) 220 to provide illumination in a specific manner, including the display commands disclosed in the methods described herein. Illumination control operations 218 can be associated with gestures of the occupant, such as the occupant touching the display, the occupant moving, or any other gesture described herein. Illumination control operations 218 can be associated with detected brightness and/or color of ambient light inside and/or outside a vehicle. In some embodiments, illumination control operations 218 can be associated with a detected mood of the occupant(s) and/or activity of the occupant(s).

Example Active Ceiling Display Systems for Sensing the Occupant of a Vehicle

Figure 3:
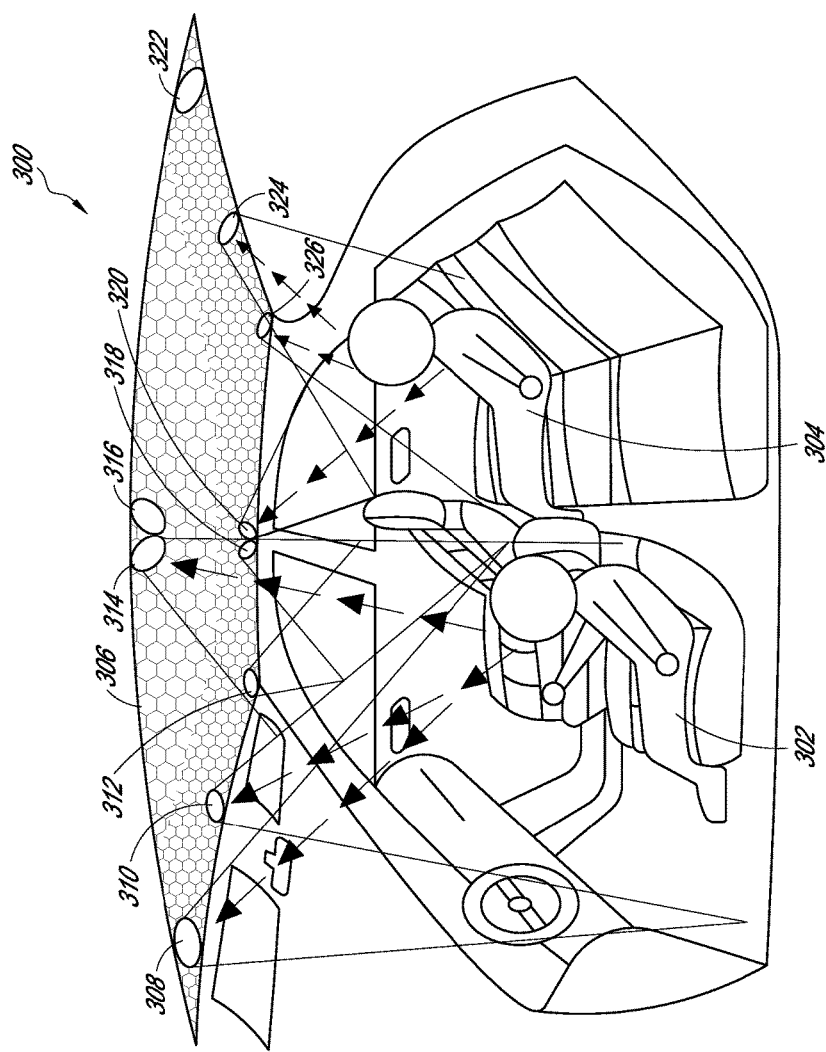
FIG. 3 illustrates an example of an active ceiling display system sensing the location of an occupant.

FIG. 3 is a drawing depicting an example embodiment of sensing system configuration 300, according to some embodiments. The drawing is provided for the purpose of facilitating description of aspects of some embodiments. The drawing does not attempt to illustrate all aspects of the disclosure and should not be considered limiting.

FIG. 3 illustrates an example of sensing system configuration 300. In some embodiments, display 306 is positioned on the ceiling of a vehicle. Sensors 308, 310, 312, 314, 316, 318, 320, 322, 324, and 326 are located within the vehicle and can provide input to sensor interface 210 of FIG. 2. Sensing system configuration 300 can be configured to have differing numbers of sensors. In some embodiments, only two sensors are located within the vehicle.

Sensors 308, 310, 312, 314, 316, 318, 320, 322, 324, and 326 can be optic, photo, light, video, camera, radar, proximity, capacitive, ultrasonic, and/or other sensors capable of sensing position and/or light. Sensors 308, 310, 312, 314, 316, 318, 320, 322, 324, and 326 can all be the same type of sensor or can be different combinations of types of sensors. In some embodiments, sensors 308, 310, 312, 314, 316, 318, 320, 322, 324, and 326 can be used according to any of the methods and systems disclosed herein to detect the gestures, positions, activities, and/or moods of an occupant, as well as ambient light.

In some embodiments, sensors 308, 310, 312, 314, 316, 318, 320, 322, 324, and 326 can be used to distinguish between occupant 302 and occupant 304. In some embodiments, 308, 310, 312, 314, 316, 318, 320, 322, 324, and 326 can be used to distinguish between animate and inanimate objects. In some embodiments, sensors 308, 310, 312, 314, 316, 318, 320, 322, 324, and 326 can be used to distinguish between humans and animals.

Figure 18:
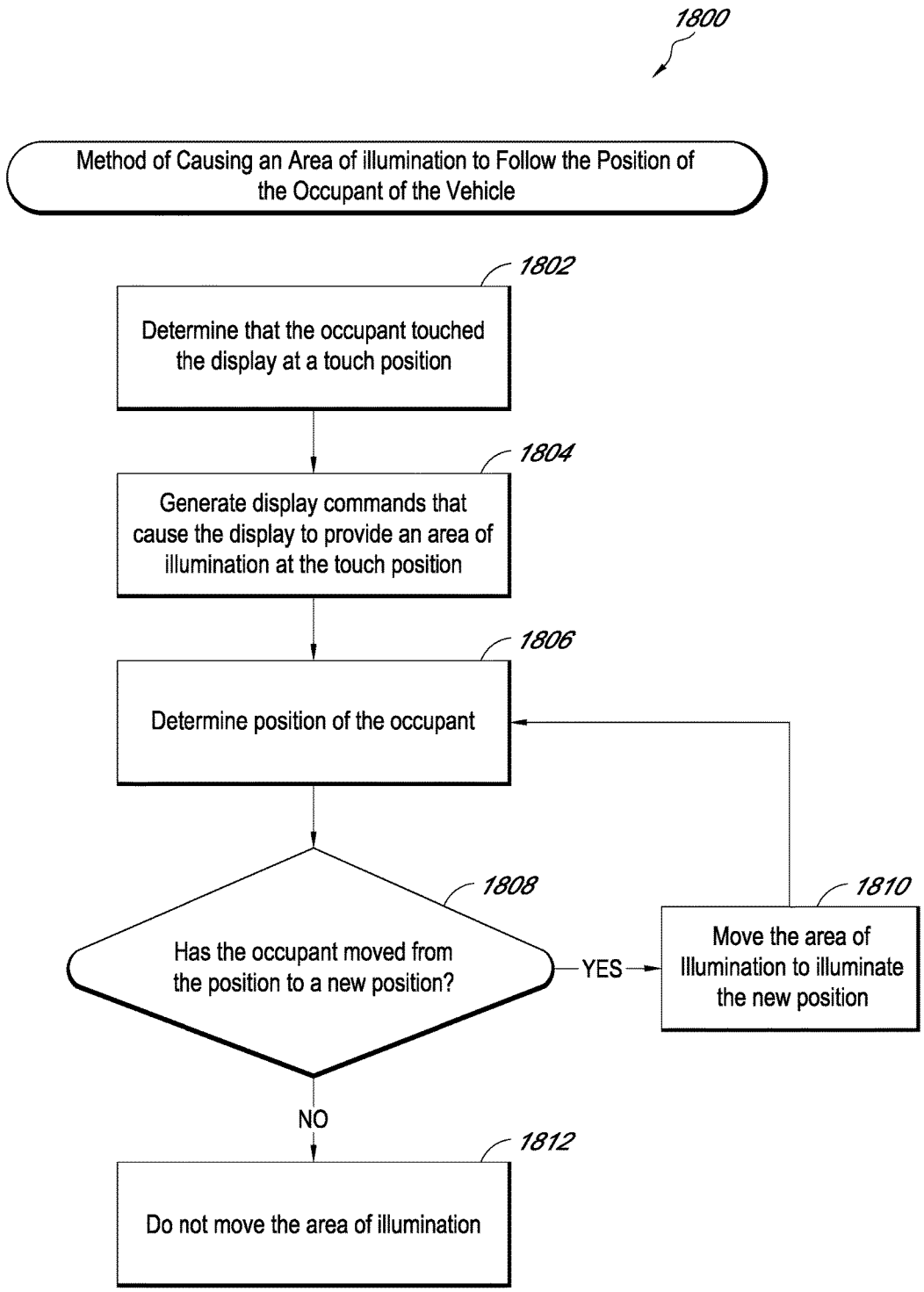
FIG. 18 illustrates an example of a method for causing an area of illumination to follow the position of the occupant of the vehicle.

Any of the sensors described in reference to FIG. 2 and any of the sensing systems described in reference to FIG. 4-7 can distinguish or assist in making the distinguishments described above. Distinguishing between occupants can ensure that the method of causing an area of illumination to follow the position of the occupant described in reference to FIG. 18 is limited to causing an area of illumination to follow the position of the occupant that performed the gesture that caused the system to provide the area of illumination. In some embodiments, distinguishing between occupants can ensure that an area of illumination associated with occupant 304 cannot be manipulated by occupant 302. In some embodiments, occupant 302, the driving occupant, has full authorization to manipulate all illumination within the vehicle. In some embodiments, occupant 304, a passenger occupant, can only manipulate the area of illumination associated with occupant 304. In some embodiments, occupant 304, a passenger occupant, cannot manipulate illumination within the vehicle that would distract occupant 302, the driver occupant. For example, occupant 304 may be unable to manipulate illumination on the display 306 within a certain distance of occupant 302, the driver occupant. In some embodiments, zones within the vehicle may be defined where an occupant located in the zone has authorization to manipulate the illumination in such zone. For example, for a vehicle that has multiple rows of seating, the first row may have a front zone and the back row may have a back row. In such case, an occupant located in the back row may only have authorization to manipulate illumination in the back row and not the front row. In some embodiments, other authorization restrictions may be placed on occupants. In some embodiments, occupant 302 may transfer or assign authorization of illumination manipulation to occupant 304 or another occupant.

In some embodiments, sensors 308, 310, 312, 314, 316, 318, 320, 322, 324, and 326 can be used to determine that an occupant is in danger and/or need of a warning. For example, sensors 308, 310, 312, 314, 316, 318, 320, 322, 324, and 326 can determine that an occupant is not secured by a seatbelt. In response to determining that an occupant is in danger, the system can generate display commands 206, via the controller 204, that cause the display 220 to provide an alert, warning the occupants of the vehicle of the danger.

As discussed, FIG. 3 illustrates an example embodiment sensing system configuration 300. Other embodiments can include one or more other criteria described with reference to FIG. 3. Embodiments that may omit or add to one or more features to the example sensing system configuration 300 of FIG. 3 are within the scope of this disclosure.

Figure 4:
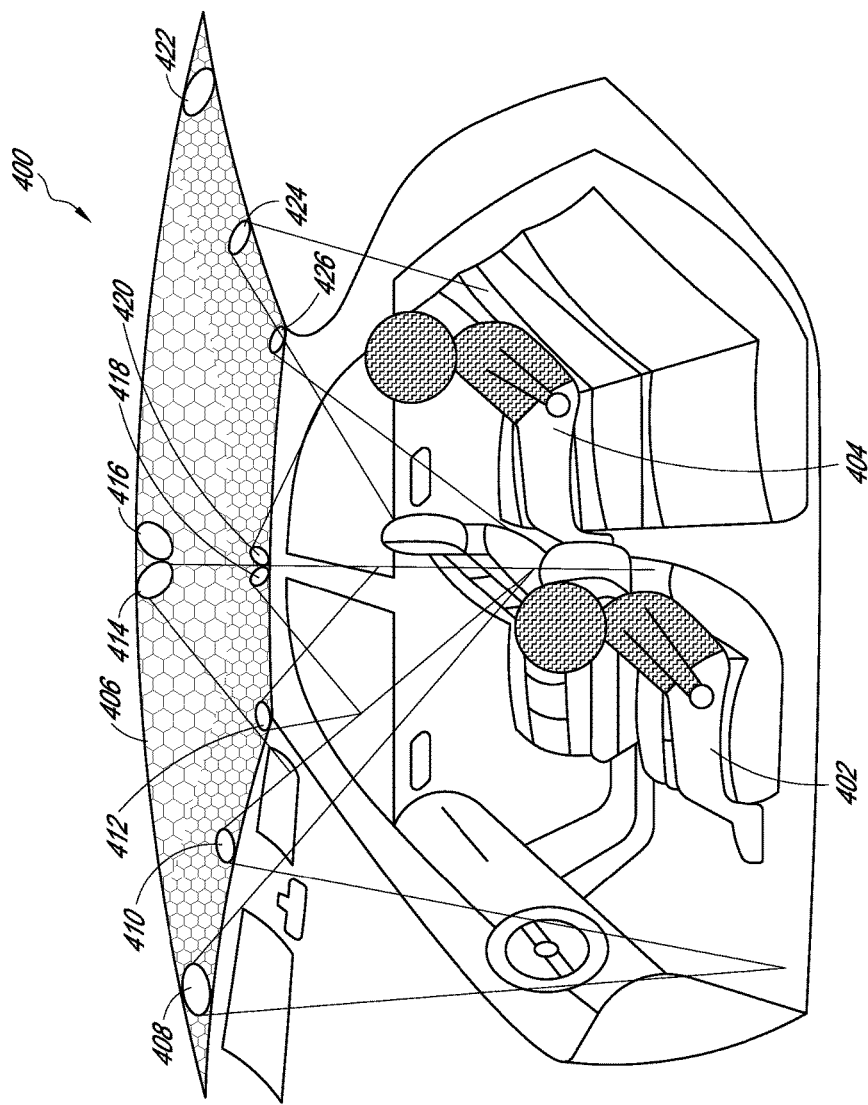
FIG. 4 illustrates an example of an active ceiling display system sensing the location of an occupant.

FIG. 4 is a drawing depicting an example embodiment of sensing system configuration 400, according to some embodiments. The drawing is provided for the purpose of facilitating description of aspects of some embodiments. The drawing does not attempt to illustrate all aspects of the disclosure and should not be considered limiting.

FIG. 4 illustrates an example of sensing system configuration 400. In some embodiments, display 406 is positioned on the ceiling of a vehicle. Sensors 408, 410, 412, 414, 416, 418, 420, 422, 424, and 426 are located within the vehicle and can provide input to sensor interface 210 of FIG. 2. Sensing system configuration 400 can be configured to have differing numbers of sensors. In some embodiments, only two sensors are located within the vehicle.

Sensors 408, 410, 412, 414, 416, 418, 420, 422, 424, and 426 can be infrared, laser, LiDAR, and or any other sensor that can detect position and/or light. Sensors 408, 410, 412, 414, 416, 418, 420, 422, 424, and 426 can all be the same type of sensor or can be different combinations of types of sensors. In some embodiments, sensors 408, 410, 412, 414, 416, 418, 420, 422, 424, and 426 can be used according to any of the methods and systems disclosed herein to detect the gestures, positions, activities, and/or moods of an occupant, as well as ambient light.

As discussed, FIG. 4 illustrates an example embodiment sensing system configuration 400. Other embodiments can include one or more other criteria described with reference to FIG. 4. Embodiments that may omit or add to one or more features to the example sensing system configuration 400 of FIG. 4 are within the scope of this disclosure.

Figure 5:
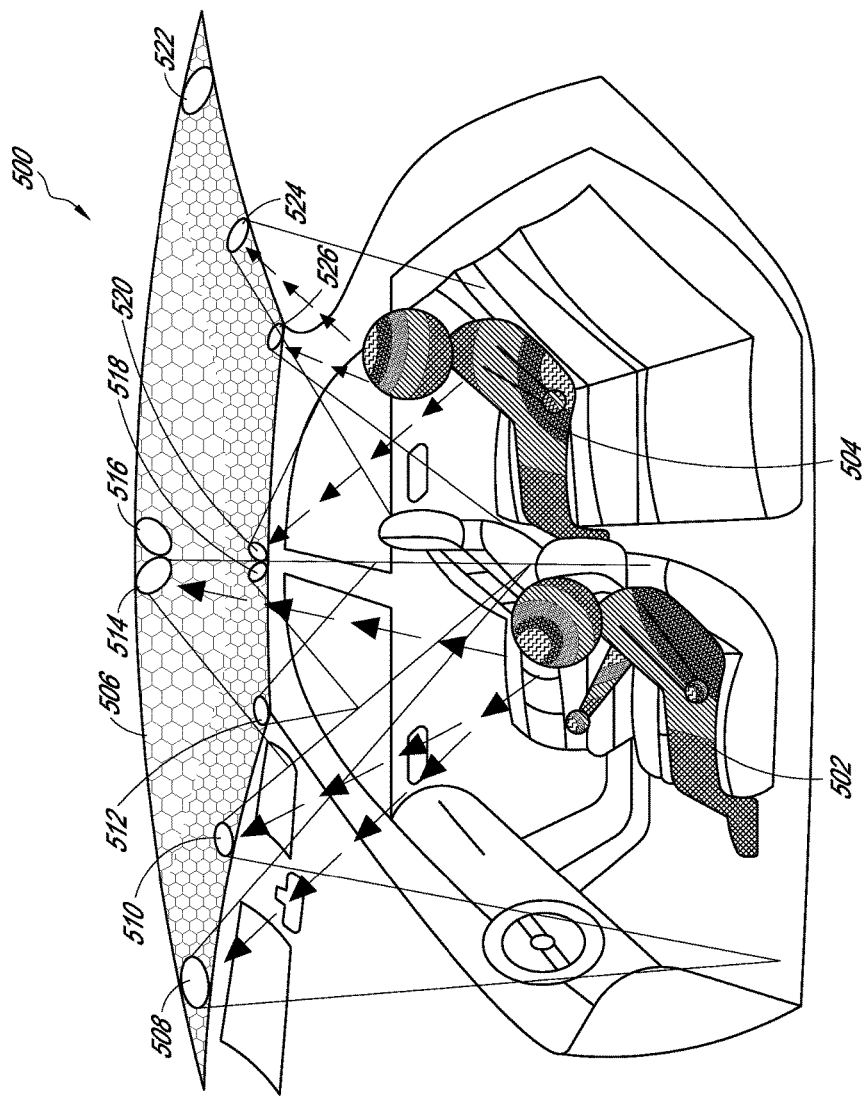
FIG. 5 illustrates an example of an active ceiling display system sensing the location of an occupant.
Figure 6:
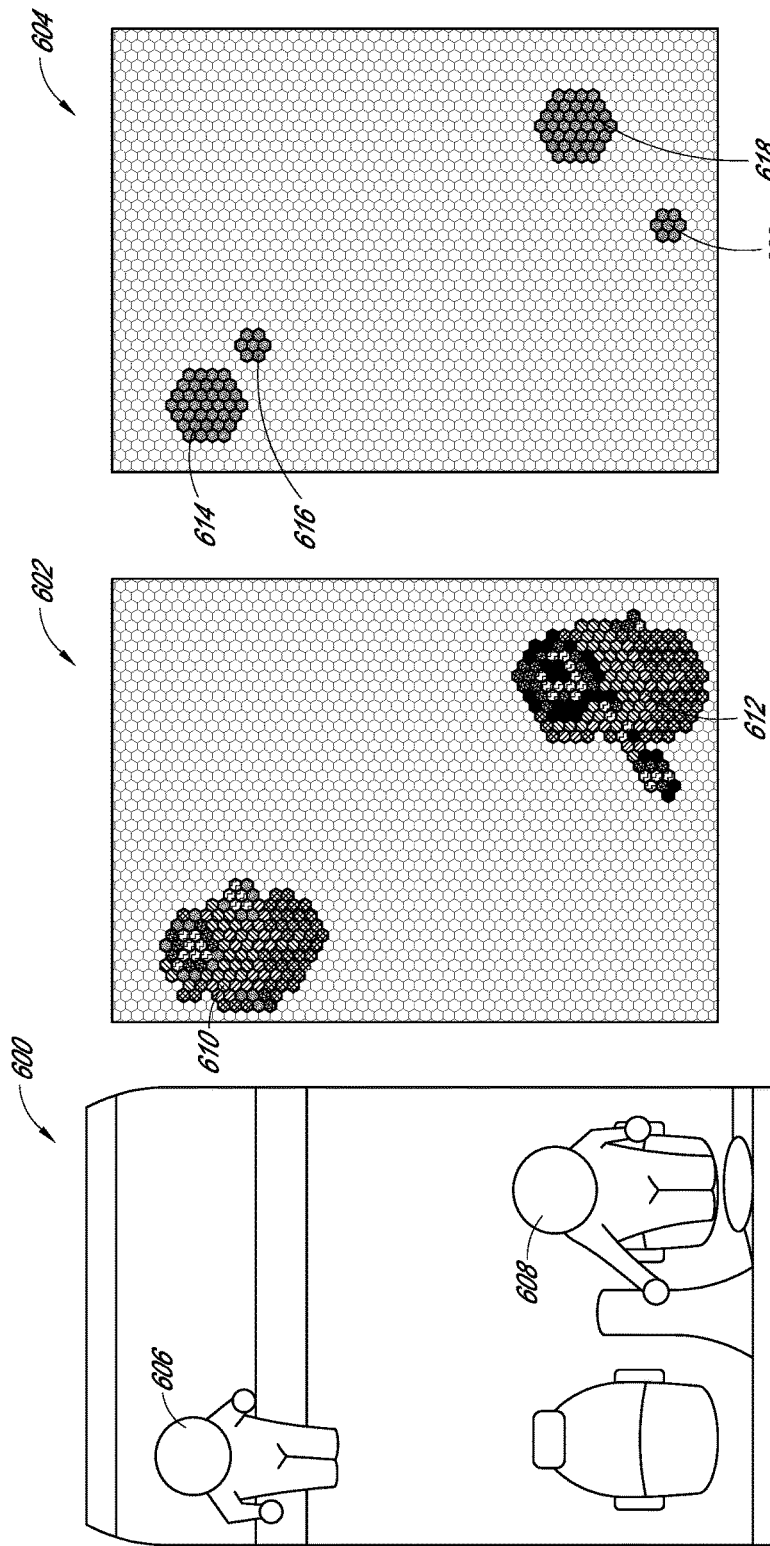
FIG. 6A illustrates an example of occupant positions.
FIG. 6B illustrates an example thermal camera view of occupant positions.
FIG. 6C illustrates example areas of illumination.

FIG. 5 is a drawing depicting an example embodiment of sensing system configuration 500, according to some embodiments. The drawing is provided for the purpose of facilitating description of aspects of some embodiments. The drawing does not attempt to illustrate all aspects of the disclosure and should not be considered limiting.

FIG. 5 illustrates an example of sensing system configuration 500. In some embodiments, display 506 is positioned on the ceiling of a vehicle. Sensors 508, 510, 512, 514, 516, 518, 520, 522, 524, and 526 are located within the vehicle and can provide input to sensor interface 210 of FIG. 2. Sensing system configuration 500 can be configured to have differing numbers of sensors. In some embodiments, only two sensors are located within the vehicle.

Sensors 508, 510, 512, 514, 516, 518, 520, 522, 524, and 526 can be thermal or any other heat sensing sensors that can detect position and/or light. Sensors 508, 510, 512, 514, 516, 518, 520, 522, 524, and 526 can all be the same type of sensor or can be different combinations of types of sensors. In some embodiments, sensors 508, 510, 512, 514, 516, 518, 520, 522, 524, and 526 can be used according to any of the methods and systems disclosed herein to detect the gestures, positions, activities, and/or moods of an occupant, as well as ambient light.

As discussed, FIG. 5 illustrates an example embodiment sensing system configuration 500. Other embodiments can include one or more other criteria described with reference to FIG. 5. Embodiments that may omit or add to one or more features to the example sensing system configuration 500 of FIG. 5 are within the scope of this disclosure.

FIG. 6A is a drawing depicting an example embodiment of passenger location configuration 600, FIG. 6B is a drawing depicting an example embodiment of a thermal camera view 602 of the passenger location configuration 600, and FIG. 6C is a drawing depicting an example embodiment of associated areas of illumination 604 based on thermal camera view 602, according to some embodiments. The drawings are provided for the purpose of facilitating description of aspects of some embodiments. The drawing do not attempt to illustrate all aspects of the disclosure and should not be considered limiting.

FIG. 6A illustrates an example of passenger location configuration 600. Occupant 608 is in the driving position of a vehicle, and occupant 606 is in the passenger position of a vehicle.

FIG. 6B illustrates an example of thermal camera view 602 of passenger location configuration 600. The thermal profile 610 is associated with occupant 606 and thermal profile 612 is associated with occupant 608.

FIG. 6C illustrates an example of associated areas of illumination 604 based on thermal camera view 602. The area of illumination 614 is associated with the head and/or body portion of thermal profile 610, and the area of illumination 616 is associated with the hand portion of thermal profile 610. The area of illumination 618 is associated with the head and/or body portion of thermal profile 612, and the area of illumination 620 is associated with the hand portion of thermal profile 612.

As discussed, FIG. 6A is a drawing depicting an example embodiment of passenger location configuration 600, FIG. 6B is a drawing depicting an example embodiment of a thermal camera view 602 of the passenger location configuration 600, and FIG. 6C is a drawing depicting an example embodiment of associated areas of illumination 604 based on thermal camera view 602. Other embodiments can include one or more other criteria described with reference to FIGS. 6A, 6B, and/or 6C. Embodiments that may omit or add to one or more features to the example passenger configuration 600 of FIG. 6A, thermal camera view 602 of FIG. 6B, and associated areas of illumination 604 of FIG. 6C are within the scope of this disclosure.

Figure 7:
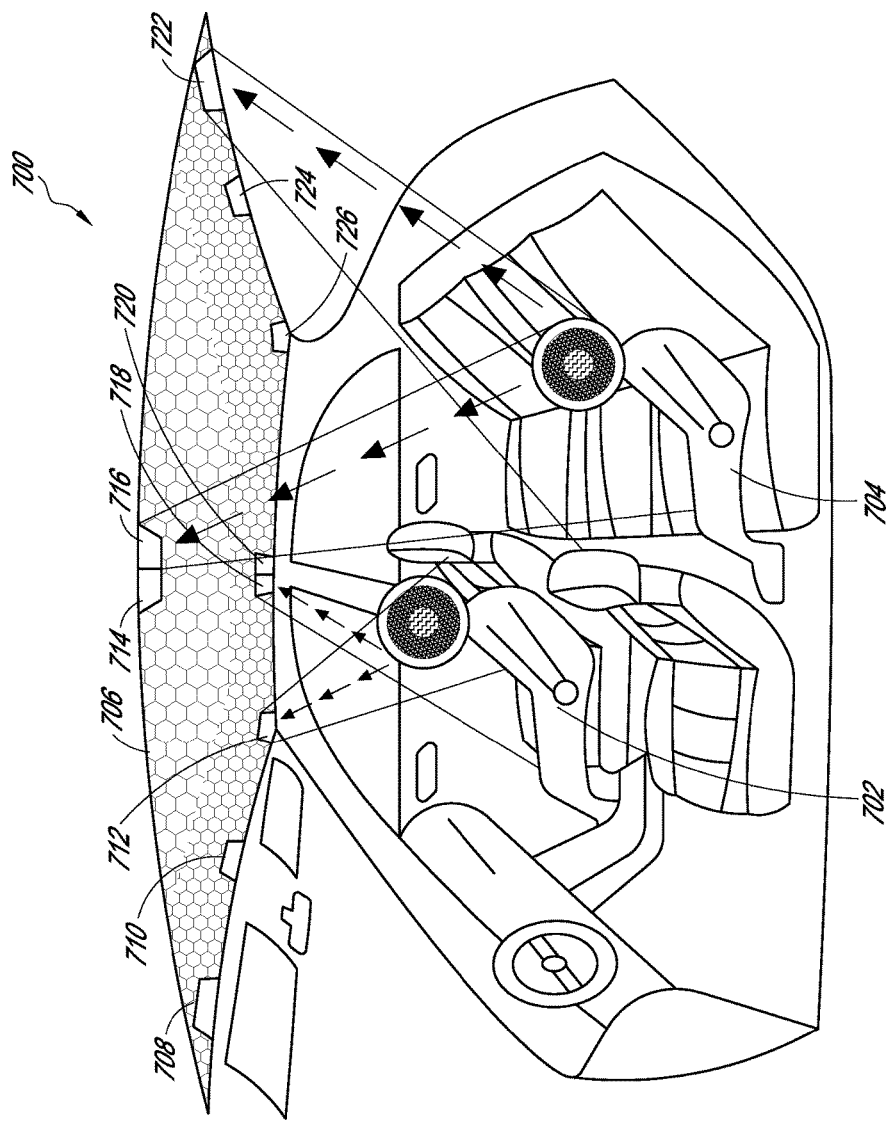
FIG. 7 illustrates an example of an active ceiling display system sensing the location of an occupant.

FIG. 7 is a drawing depicting an example embodiment of sensing system configuration 700, according to some embodiments. The drawing is provided for the purpose of facilitating description of aspects of some embodiments. The drawing does not attempt to illustrate all aspects of the disclosure and should not be considered limiting.

FIG. 7 illustrates an example of sensing system configuration 700. In some embodiments, display 706 is positioned on the ceiling of a vehicle. Sensors 708, 710, 712, 714, 716, 718, 720, 722, 724, and 726 are located within the vehicle and can provide input to sensor interface 210 of FIG. 2. Sensing system configuration 700 can be configured to have differing numbers of sensors. In some embodiments, only two sensors are located within the vehicle.

Sensors 708, 710, 712, 714, 716, 718, 720, 722, 724, and 726 can be any sensor described in reference to FIG. 2 that can detect position, distance, heat, audio, and/or light. Sensors 708, 710, 712, 714, 716, 718, 720, 722, 724, and 726 can all be the same type of sensor or can be different combinations of types of sensors. In some embodiments, 708, 710, 712, 714, 716, 718, 720, 722, 724, and 726 can be used according to any of the methods and systems disclosed herein to detect the gestures, positions, activities, and/or moods of an occupant, as well as ambient light.

As discussed, FIG. 7 illustrates an example embodiment sensing system configuration 700. Other embodiments can include one or more other criteria described with reference to FIG. 7. Embodiments that may omit or add to one or more features to the example sensing system configuration 700 of FIG. 7 are within the scope of this disclosure.

Example Touch Gesture Resulting in an Area of Illumination

Figure 8:
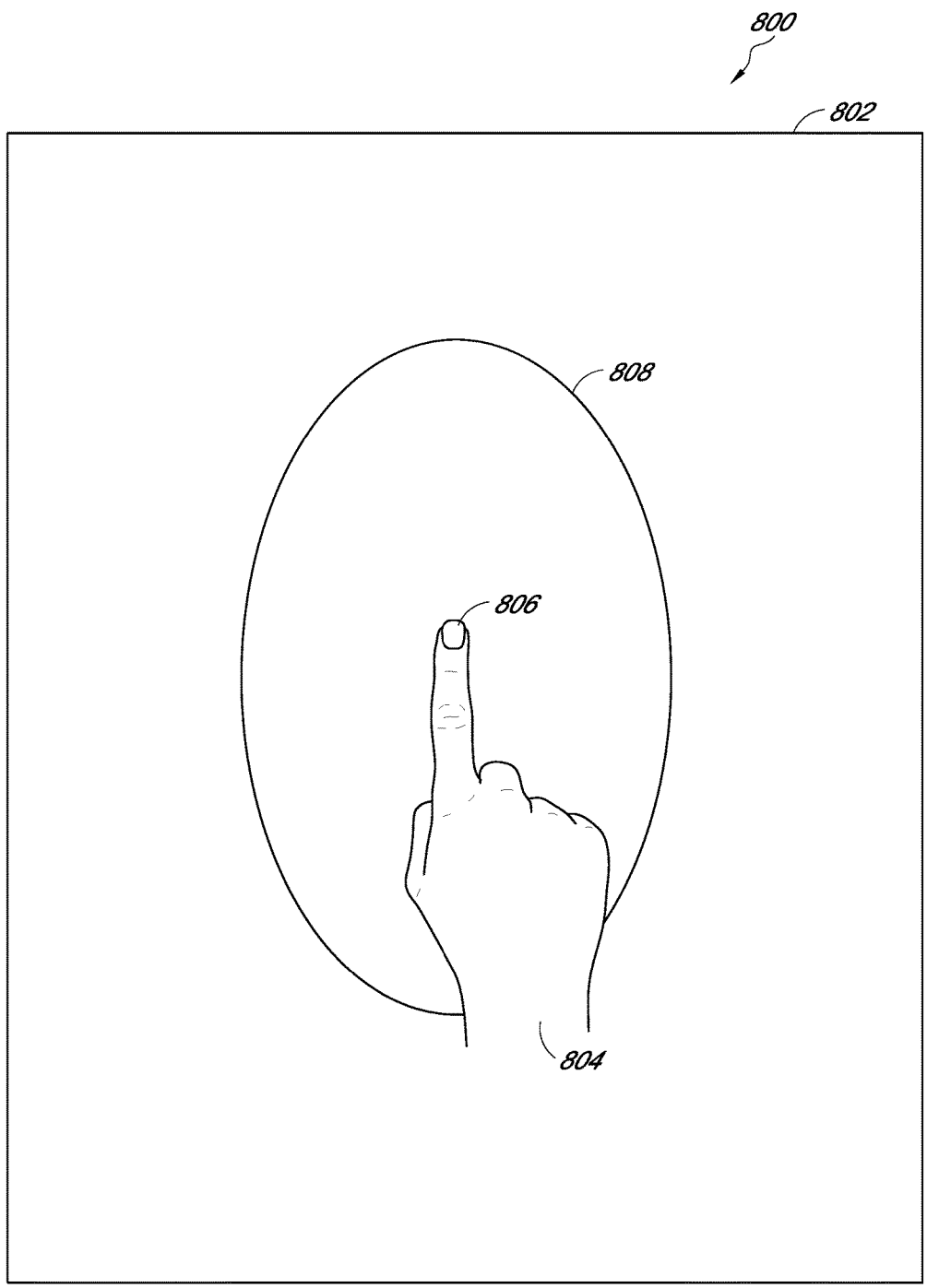
FIG. 8 illustrates an example of an occupant touching a display and the resulting area of illumination.

FIG. 8 is a drawing depicting an example embodiment of touch gesture control 800, according to some embodiments. The drawing is provided for the purpose of facilitating description of aspects of some embodiments. The drawing does not attempt to illustrate all aspects of the disclosure and should not be considered limiting.

FIG. 8 illustrates an example of touch gesture illumination control 800. An occupant 804 touches display 802 at a touch position 806. In some embodiments, a touch, or touch gesture, can be any contact between the occupant 804 and the display 802 at a touch position 806. In some embodiments, a touch, or touch gesture, is a contact between the occupant 804 and the display 802 at a touch position 806 that is longer than a length of time. In some embodiments, a touch, or touch gesture, is a contact between the occupant 804 and the display 802 at a touch position 806 that is longer than a length of time but shorter than another length of time. The hardware processor 212 executes instructions 216 that cause the sensor interface 210 to receive input from sensor(s) 222 that is indicative of a gesture from the occupant 804 to control illumination within the vehicle. The hardware processor 212 executes instructions 216 to interpret the sensor input to determine an illumination control operation 218 associated with the occupant 804 touching display 802, performing a touch gesture, at a touch position 806.

In some embodiments, the illumination control operation 218 associated with a touch gesture is to provide an area of illumination 808 on the display 802 at the touch position 806. An area of illumination 808 can be configured to use the display 802 to illuminate a cabin of a vehicle or a portion of a cabin of a vehicle. An area of illumination 808 can be configured to display visual data on a display 802 to approximate or replicate light from a lamp, light bulb, flashlight, spotlight, and/or other modes of illumination. In some embodiments, an area of illumination 808 can be any shape, including but not limited to circles, ovals, polygons, irregular shapes, slits, and/or patterns. An area of illumination 808 resulting from a touch gesture can be an area of illumination 808 with a default shape, color, brightness, and/or other aspects. The default shape can be an oval, as depicted in FIG. 8. In some embodiments, an area of illumination 808 can be of different levels of brightness. An area of illumination 808 can be any color. In some embodiments, an area of illumination 808 can be of varying sizes. An area of illumination 808 can be an unbroken illuminated area on the display 806, and in some embodiments, an area of illumination 808 can consist of several separate illuminated areas. In some embodiments, an area of illumination 808 can be defined on its boundary and/or boundaries by a soft perimeter distinguishing illuminated areas of the display 802 from areas that are not illuminated. In some embodiments, an area of illumination 808 can be defined on its boundary and/or boundaries by a hard perimeter distinguishing illuminated areas of the display 802 from areas that are not illuminated, such that there is a substantially clear distinction between illuminated areas and those that are not. In some embodiments, an area of illumination can be an image and/or video. In some embodiments, an area of illumination is centered on the touch position 806. In some embodiments, an area of illumination is located at some proximity from the touch position 806.

Once an illumination control operation 218 associated with a touch gesture is determined, the hardware processor 212 executes instructions 216 that cause the system to generate, via the display controller 204, display commands 206 configured to cause the display 802 to effectuate the illumination control operation 218 as disclosed herein.

The method described in reference to FIG. 8 is directed toward creating an area of illumination. A similar method can be employed to deactivate an area of illumination. For example, an occupant 804 can make contact with the display 802 within an already created area of illumination 808 and, without substantially moving the appendage making the contact, maintain contact for longer than a length of time. After the contact is maintained for longer than a length of time, the area of illumination 808 can deactivate. In some embodiments, an area of illumination 808 is deactivated when an occupant ceases to maintain contact after maintaining contact for longer than a length of time. In some embodiments, the contact must be maintained longer than a length of time but shorter than another length of time. In some embodiments, an area of illumination 808 can be deactivated when an occupant performs several tapping gestures, as disclosed herein, within an area of illumination. In some embodiments, a console of the vehicle can have one or more buttons that can be operated by an occupant to create an area of illumination at a location on the display 802 or deactivate an area of illumination and/or several areas of illumination by regions on the display 802. In some embodiments, a console of the vehicle can have one or more buttons to illuminate regions and/or all of the display 802. In some embodiments, a console of the vehicle can have one or more buttons to deactivate regions and/or all of the display 802. In some embodiments, a console of the vehicle can have one or more buttons to activate and deactivate a diffuse light pattern as described in reference to FIG. 21.

As discussed, FIG. 8 illustrates an example embodiment of touch gesture control 800. Other embodiments can include one or more other criteria described with reference to FIG. 8. Further, the description of an area of illumination 808 can apply to any area of illumination discussed herein. Other gestures could be used to cause the system to generate an area of illumination 808 at a given position. Embodiments that may omit or add to one or more features to the example touch gesture control 800 of FIG. 8 are within the scope of this disclosure.

Example Tapping Gesture Changing the Shape of an Area of Illumination

Figure 9:
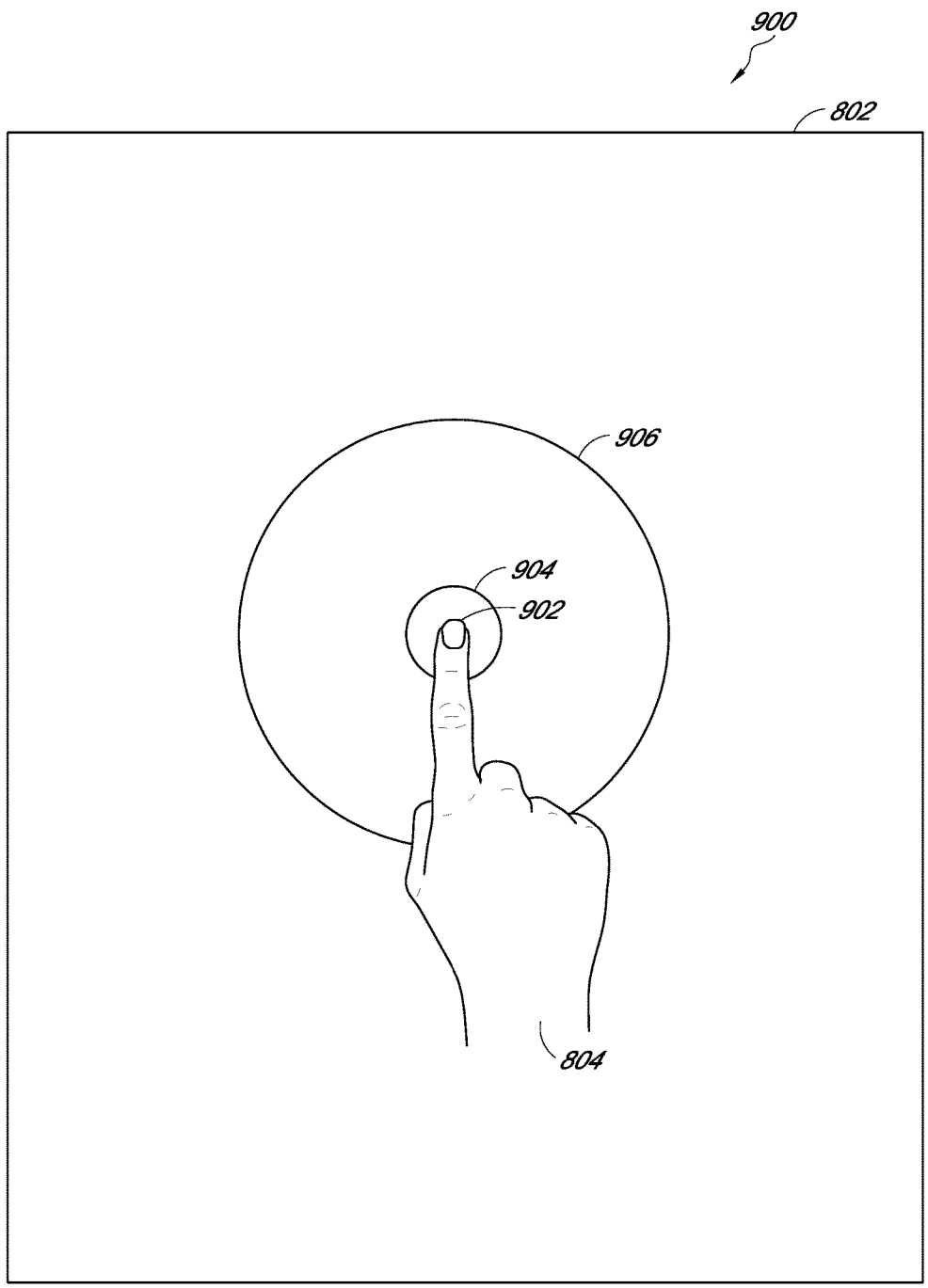
FIG. 9 illustrates an example of an occupant tapping an area of illumination and the resulting change in shape of the area of illumination.

FIG. 9 is a drawing depicting an example embodiment of tapping control gesture 900, according to some embodiments. The drawing is provided for the purpose of facilitating description of aspects of some embodiments. The drawing does not attempt to illustrate all aspects of the disclosure and should not be considered limiting.

FIG. 9 illustrates an example of tapping control gesture 900. An occupant 804 can perform a tapping gesture 904 on display 802 at a point of contact 902 within an area of illumination. In some embodiments, a tapping gesture 904 is a contact between the occupant 804 and the display 802 at a point of contact 902 within an area of illumination that is shorter than a length of time. The hardware processor 212 executes instructions 216 that cause the sensor interface 210 to receive input from sensor(s) 222 that is indicative of a gesture from the occupant 804 to control illumination within the vehicle. The hardware processor 212 executes instructions 216 to interpret the sensor input to determine an illumination control operation 218 associated with the occupant 804 performing a tapping gesture 904 on display 802 at a point of contact 902 within an area of illumination.

In some embodiments, the illumination control operation 218 associated with a touch gesture 904 is to change the shape of an area of illumination. For example, in some embodiments, the illumination control operation 218 associated with a tapping gesture 904 is to change the shape of an area of illumination 808, an oval, into the shape of an area of illumination 906, a circle. In some embodiments, the illumination control operation 218 associated with a tapping gesture 904 is to change the shape of an area of illumination into a circle, oval, polygon, and/or any other shape.

Once an illumination control operation 218 associated with a tapping gesture 904 is determined, the hardware processor 212 executes instructions 216 that cause the system to generate, via the display controller 204, display commands 206 configured to cause the display 802 to effectuate the illumination control operation 218 as disclosed herein.

As discussed, FIG. 9 illustrates an example embodiment of a tapping gesture control 900. Other embodiments can include one or more other criteria described with reference to FIG. 9. Other gestures could be used to cause the system to change the shape of an area of illumination. Embodiments that may omit or add to one or more features to the example tapping gesture control 900 of FIG. 9 are within the scope of this disclosure.

Example Double-Tapping Gesture Changing the Shape of an Area of Illumination

Figure 10:
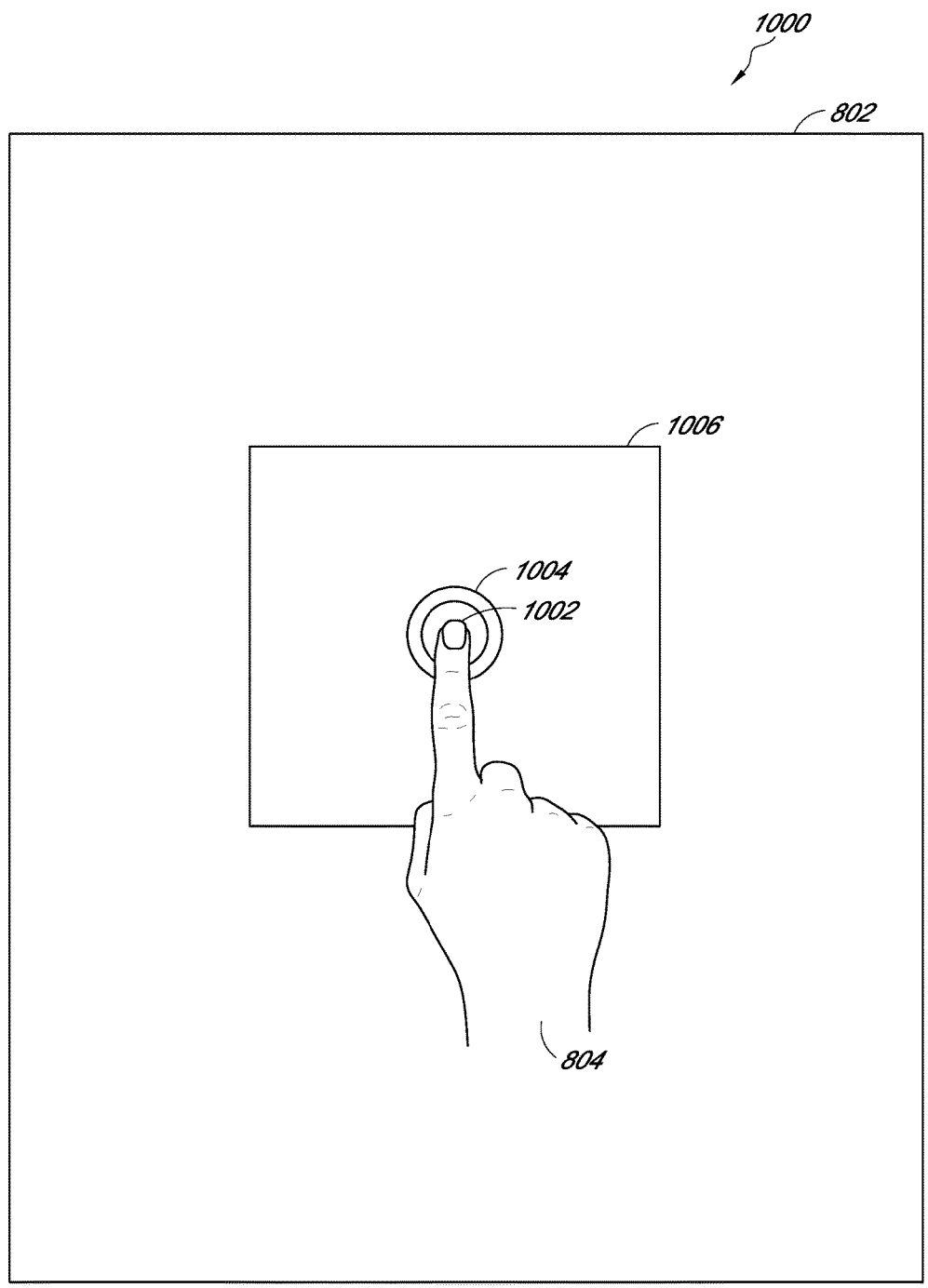
FIG. 10 illustrates an example of an occupant double-tapping an area of illumination and the resulting change in shape of the area of illumination into a square.

FIG. 10 is a drawing depicting an example embodiment of double-tapping control gesture 1000, according to some embodiments. The drawing is provided for the purpose of facilitating description of aspects of some embodiments. The drawing does not attempt to illustrate all aspects of the disclosure and should not be considered limiting.

FIG. 10 illustrates an example of double-tapping control gesture 1000. An occupant 804 can perform a double-tapping gesture 1004 on display 802 at any two points of contact 1002 within an area of illumination. In some embodiments, a double-tapping gesture 1002 is a sequence of two distinct sequential contacts between the occupant 804 and the display 802 at any two points of contact 1002 within an area of illumination, where each contact is shorter than a length of time and the two distinct contacts occur within a length of time or less than a length of time. In some embodiments, the time difference between the beginning or end of a first contact and the beginning or end of the second contact must occur within a length of time or less than a length of time. The hardware processor 212 executes instructions 216 that cause the sensor interface 210 to receive input from sensor(s) 222 that is indicative of a gesture from the occupant 804 to control illumination within the vehicle. The hardware processor 212 executes instructions 216 to interpret the sensor input to determine an illumination control operation 218 associated with the occupant 804 performing a double-tapping gesture 1004 on display 802 at any two points of contact 1002 within an area of illumination.

In some embodiments, the illumination control operation 218 associated with a double-tapping gesture 1004 is to change the shape of an area of illumination into the area of illumination 1006, a square. In some embodiments, the illumination control operation 218 associated with a double-tapping gesture 1004 is to change the shape of an area of illumination into a circle, oval, polygon, and/or any other shape.

Once an illumination control operation 218 associated with a double-tapping gesture 1004 is determined, the hardware processor 212 executes instructions 216 that cause the system to generate, via the display controller 204, display commands 206 configured to cause the display 802 to effectuate the illumination control operation 218 as disclosed herein.

As discussed, FIG. 10 illustrates an example embodiment of a double-tapping gesture control 1000. Other embodiments can include one or more other criteria described with reference to FIG. 10. Other gestures could be used to cause the system to change the shape of an area of illumination. Embodiments that may omit or add to one or more features to the example double-tapping gesture control 1000 of FIG. 10 are within the scope of this disclosure.

Example Triple-Tapping Gesture Changing the Shape of an Area of Illumination

Figure 11:
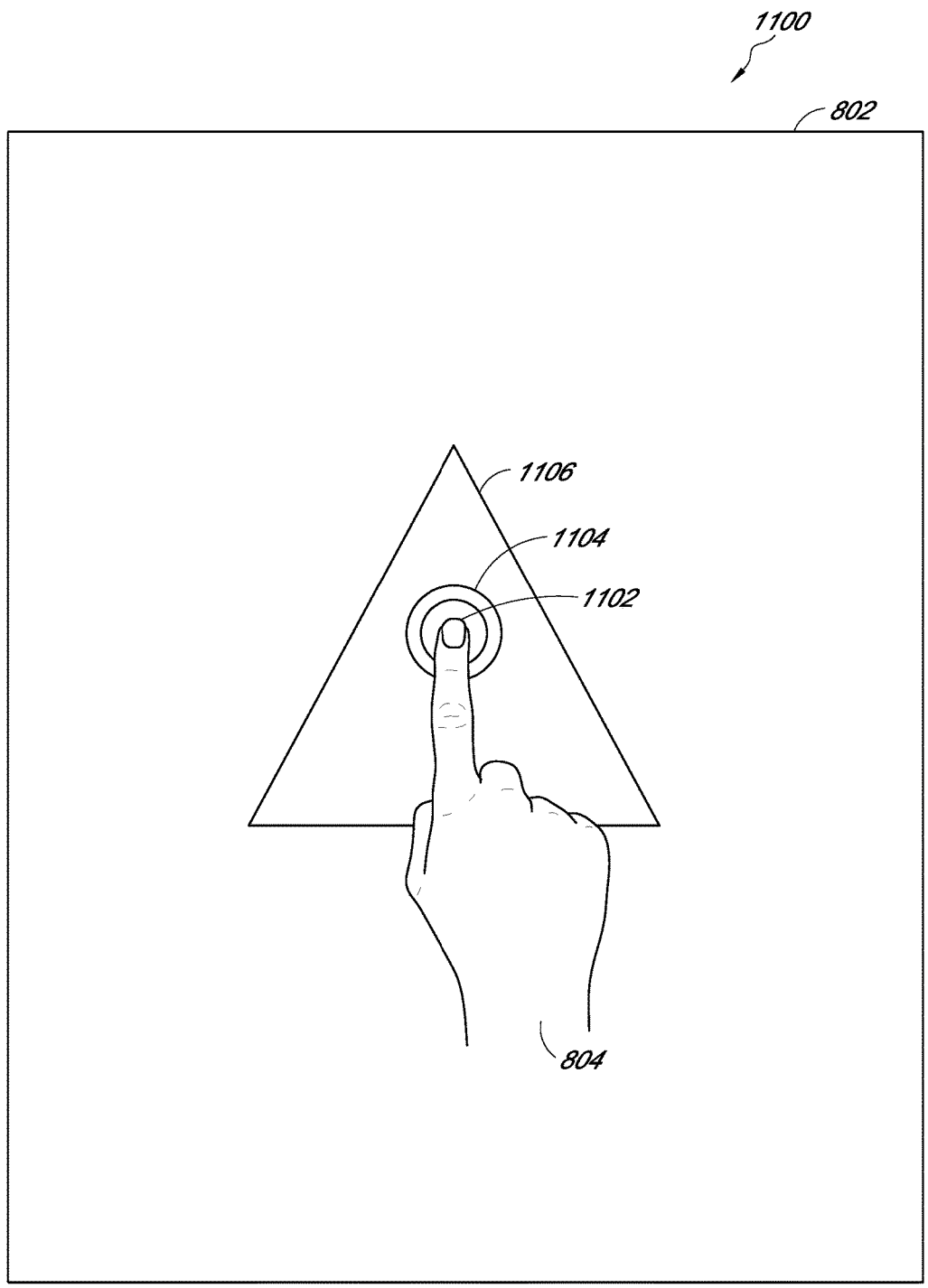
FIG. 11 illustrates an example of an occupant triple-tapping an area of illumination and the resulting change in shape of the area of illumination into a triangle.

FIG. 11 is a drawing depicting an example embodiment of triple-tapping control gesture 1100, according to some embodiments. The drawing is provided for the purpose of facilitating description of aspects of some embodiments. The drawing does not attempt to illustrate all aspects of the disclosure and should not be considered limiting.

FIG. 11 illustrates an example of triple-tapping control gesture 1100. An occupant 804 can perform a triple-tapping gesture 1104 on display 802 at any three points of contact 1102 within an area of illumination. In some embodiments, a triple-tapping gesture 1104 is a sequence of three separate sequential contacts between the occupant 804 and the display 802 at any three points of contact 1102 within an area of illumination, where each contact is shorter than a length of time and the three distinct contacts occur within a length of time or less than a length of time. In some embodiments, the time difference between the beginning or end of a first contact and the beginning or end of the second contact and the beginning or end of a third contact must occur within a length of time or less than a length of time. The hardware processor 212 executes instructions 216 that cause the sensor interface 210 to receive input from sensor(s) 222 that is indicative of a gesture from the occupant 804 to control illumination within the vehicle. The hardware processor 212 executes instructions 216 to interpret the sensor input to determine an illumination control operation 218 associated with the occupant 804 performing a triple-tapping gesture 1104 on display 802 at any three points of contact 1102 within an area of illumination.

In some embodiments, the illumination control operation 218 associated with a triple-tapping gesture 1104 is to change the shape of an area of illumination into the area of illumination 1106, a triangle. In some embodiments, the illumination control operation 218 associated with a triple-tapping gesture 1104 is to change the shape of an area of illumination into a circle, oval, polygon, and/or any other shape.

Once an illumination control operation 218 associated with a triple-tapping gesture 1004 is determined, the hardware processor 212 executes instructions 216 that cause the system to generate, via the display controller 204, display commands 206 configured to cause the display 802 to effectuate the illumination control operation 218 as disclosed herein.

As discussed, FIG. 11 illustrates an example embodiment of a triple-tapping gesture control 1100. Other embodiments can include one or more other criteria described with reference to FIG. 11. Other gestures could be used to cause the system to change the shape of an area of illumination. Embodiments that may omit or add to one or more features to the example triple-tapping gesture control 1100 of FIG. 11 are within the scope of this disclosure.

Example Dragging Gesture Changing the Location of an Area of Illumination

Figure 12:
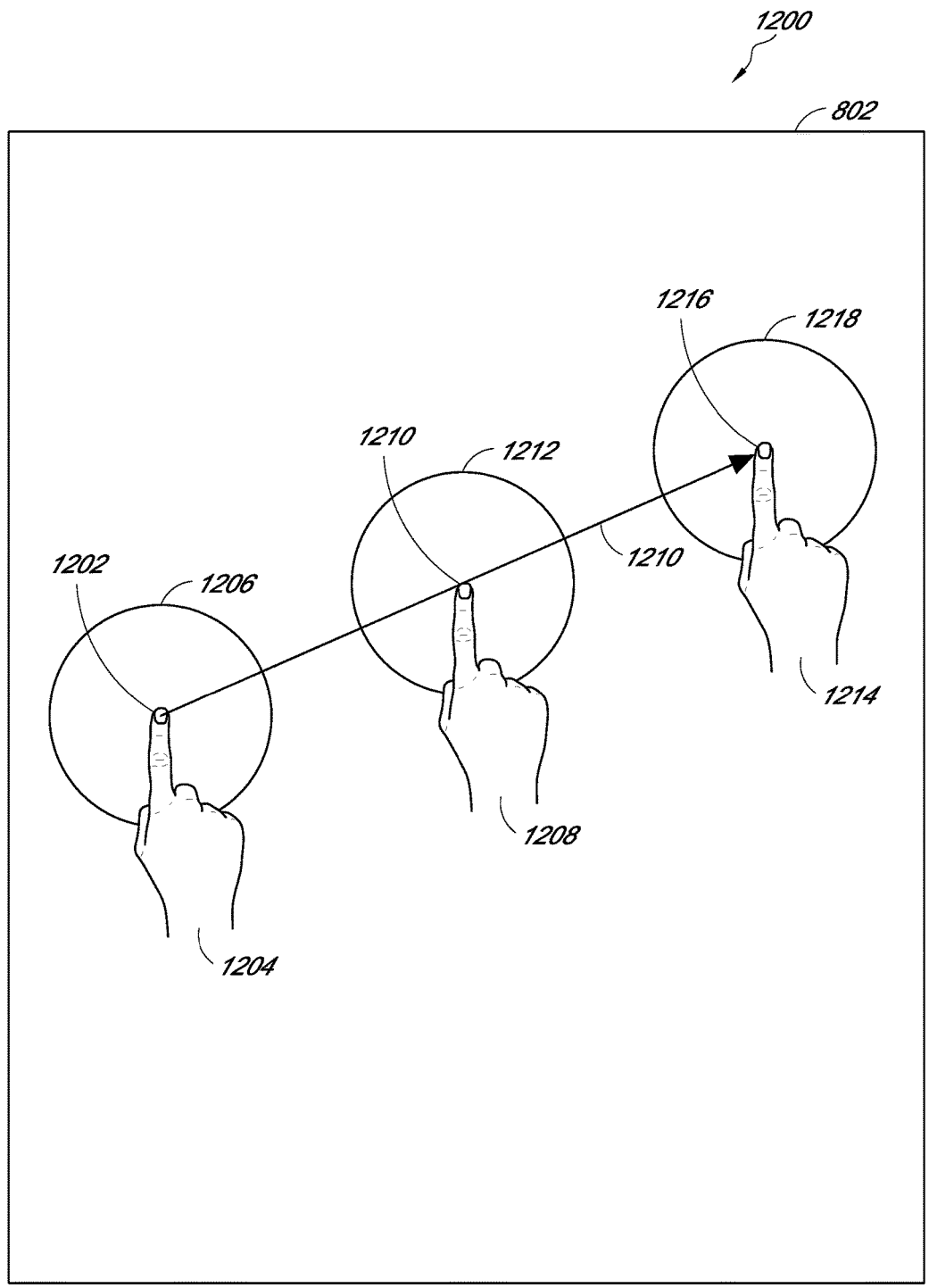
FIG. 12 illustrates an example of an occupant performing a dragging gesture beginning within the area of illumination and the resulting movement of the area of illumination.

FIG. 12 is a drawing depicting an example embodiment of dragging control gesture 1200, according to some embodiments. The drawing is provided for the purpose of facilitating description of aspects of some embodiments. The drawing does not attempt to illustrate all aspects of the disclosure and should not be considered limiting.

FIG. 12 illustrates an example of dragging control gesture 1200. An occupant 1204 can perform a dragging gesture on display 802 beginning at a point of contact 1202 within an area of illumination 1206. In some embodiments, an occupant performs a dragging gesture when the occupant 1204 makes contact with the display 802 at a point of contact 1202 within an area of illumination 1206 and, while maintaining contact with the display 802, moves to a new point of contact 1216. In some embodiments, the distance between the point of contact 1202 and the new point of contact 1216 must exceed a distance in order to perform a dragging gesture, so that inconsequential movements will not be determined to be a dragging gesture. In some embodiments, the path along the display 802 where the occupant 1204 passed in moving from point of contact 1202 to new point of contact 1216 is the dragging path 1220. The hardware processor 212 executes instructions 216 that cause the sensor interface 210 to receive input from sensor(s) 222 that is indicative of a gesture from the occupant 804 to control illumination within the vehicle. The hardware processor 212 executes instructions 216 to interpret the sensor input to determine an illumination control operation 218 associated with the occupant 804 performing a dragging gesture on display 802 beginning at a point of contact 1202 within an area of illumination 1206.

In some embodiments, the illumination control operation 218 associated with a dragging gesture is to move the location of an area of illumination 1206 to the new point of contact 1216. In some embodiments, the area of illumination 1206 is moved to be in the position of area of illumination 1218 which is located at the new point of contact 1216. Area of illumination 1218 can be centered on the new point of contact 1216. Area of illumination 1218 can be near the new point of contact 1216. Occupant 1214 is occupant 1204 but at a subsequent moment in time after moving to the new point of contact 1216. In some embodiments, the area of illumination 1206 moves with occupant 1204 as occupant 1204 moves along the dragging path 1220 from point of contact 1202 to a new point of contact 1216. For example, area of illumination 1212 is a transition area of illumination located at transition point of contact 1210 that is a result of occupant 1208, which is occupant 1204 but at a subsequent moment in time, maintaining contact with display 802 as occupant 1204 moves to new point of contact 1216. Consequently, the area of illumination 1206 would follow the dragging path 1220, while continuing to illuminate. In some embodiments, area of illumination 1218 remains located at new point of contact 1216 when occupant 1214 ceases to maintain contact with the display 802.

Once an illumination control operation 218 associated with a dragging gesture is determined, the hardware processor 212 executes instructions 216 that cause the system to generate, via the display controller 204, display commands 206 configured to cause the display 802 to effectuate the illumination control operation 218 as disclosed herein.

As discussed, FIG. 12 illustrates an example embodiment of a dragging gesture control 1200. Other embodiments can include one or more other criteria described with reference to FIG. 12. Other gestures could be used to cause the system to drag an area of illumination from one location to another. Embodiments that may omit or add to one or more features to the example dragging gesture control 1200 of FIG. 12 are within the scope of this disclosure.

Example Flicking Gesture Changing the Location of an Area of Illumination

Figure 13:
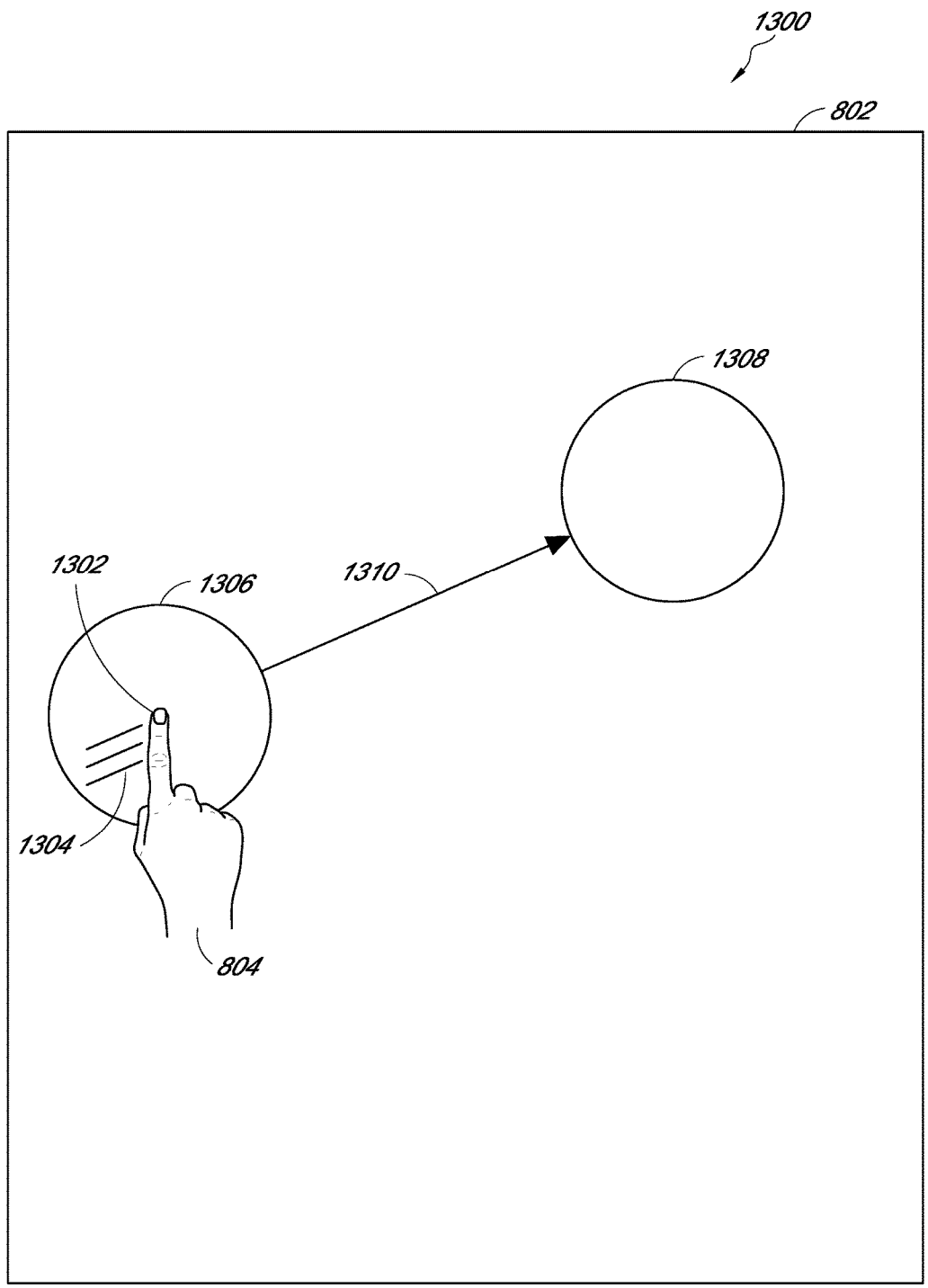
FIG. 13 illustrates an example of an occupant performing a flicking gesture beginning within the area of illumination and the resulting movement of the area of illumination.

FIG. 13 is a drawing depicting an example embodiment of flicking control gesture 1300, according to some embodiments. The drawing is provided for the purpose of facilitating description of aspects of some embodiments. The drawing does not attempt to illustrate all aspects of the disclosure and should not be considered limiting.

FIG. 13 illustrates an example of flicking control gesture 1300. An occupant 804 can perform a flicking gesture 1304 on display 802 beginning at a point of contact 1302 within an area of illumination 1306. In some embodiments, an occupant performs a flicking gesture 1304 when the occupant 804 makes contact with the display 802 at a point of contact 1302 within an area of illumination 1306 and flicks in a direction and at a speed. In some embodiments, an occupant performs a flicking gesture 1304 when the occupant 804 makes contact with the display 802 at a point of contact 1302 and swipes in a direction and at a speed. The hardware processor 212 executes instructions 216 that cause the sensor interface 210 to receive input from sensor(s) 222 that is indicative of a gesture from the occupant 804 to control illumination within the vehicle. The hardware processor 212 executes instructions 216 to interpret the sensor input to determine an illumination control operation 218 associated with the occupant 804 performing a flicking gesture on display 802 beginning at a point of contact 1302 within an area of illumination 1306.

In some embodiments, the illumination control operation 218 associated with a flicking gesture 1304 is to move the location of an area of illumination 1306 to the new location of 1308. In some embodiments, the direction of the flicking gesture 1304 determines the direction in which the area of illumination 1306 will move. In some embodiments, the speed of the flicking gesture 1304 determines the distance the area of illumination 1306 will travel. The distance moved can be proportional to the speed of the flicking gesture 1304. In some embodiments, the illumination control operation 218 associated with the flicking gesture 1304 includes an algorithm, with direction and speed of the flicking gesture as inputs, that determines the direction and distance to which the area of illumination 1306 will travel. For example, in some embodiments, the area of illumination 1306 travels along path 1310 to the position of area of illumination 1308, and the direction and length of path 1310 is determined by the direction and speed of flicking gesture 1304. In some embodiments, the direction of path 1310 will be limited to and/or favor directions that will result in the area of illumination 1306 moving to a position on the display 802 that is above a seat in the vehicle. In some embodiments, the direction of path 1310 will be limited to and/or favor directions that will result in the area of illumination 1306 moving to a position on the display 802 that is above an occupant in the vehicle. In some embodiments, the direction of path 1310 will be limited to and/or favor directions that will result in the area of illumination 1306 moving to one of a discrete number of positions on the display 802. In some embodiments, the speed of the flicking gesture 1304 will cause the area of illumination 1306 to be limited to and/or favor moving to locations on display 802 that are above discrete seating rows in a vehicle. For example, in some embodiments, the speed of a flicking gesture 1304 may cause the distance of path 1310 to be a length that ends at a position on display 802 that is above or near above the first seating row in a vehicle. In some embodiments, the speed of a flicking gesture 1304 may cause the distance of path 1310 to be a length that ends at or near the second row of a vehicle, and consequently, passes the first seating row in a vehicle. In some embodiments, the flicking gesture will cause the association of the illumination to transfer from the occupant executing the flicking gesture to another occupant located near or below the position of area of illumination 1308, at the end of the path 1310.

Once an illumination control operation 218 associated with a flicking gesture is determined, the hardware processor 212 executes instructions 216 that cause the system to generate, via the display controller 204, display commands 206 configured to cause the display 802 to effectuate the illumination control operation 218 as disclosed herein.

As discussed, FIG. 13 illustrates an example embodiment of a flicking gesture control 1300. Other embodiments can include one or more other criteria described with reference to FIG. 12. Other gestures could be used to cause the system to move an area of illumination from one location to another. Embodiments that may omit or add to one or more features to the example flicking gesture control 1300 of FIG. 13 are within the scope of this disclosure.

Example Pinching Gesture Changing the Size of an Area of Illumination

Figure 14:
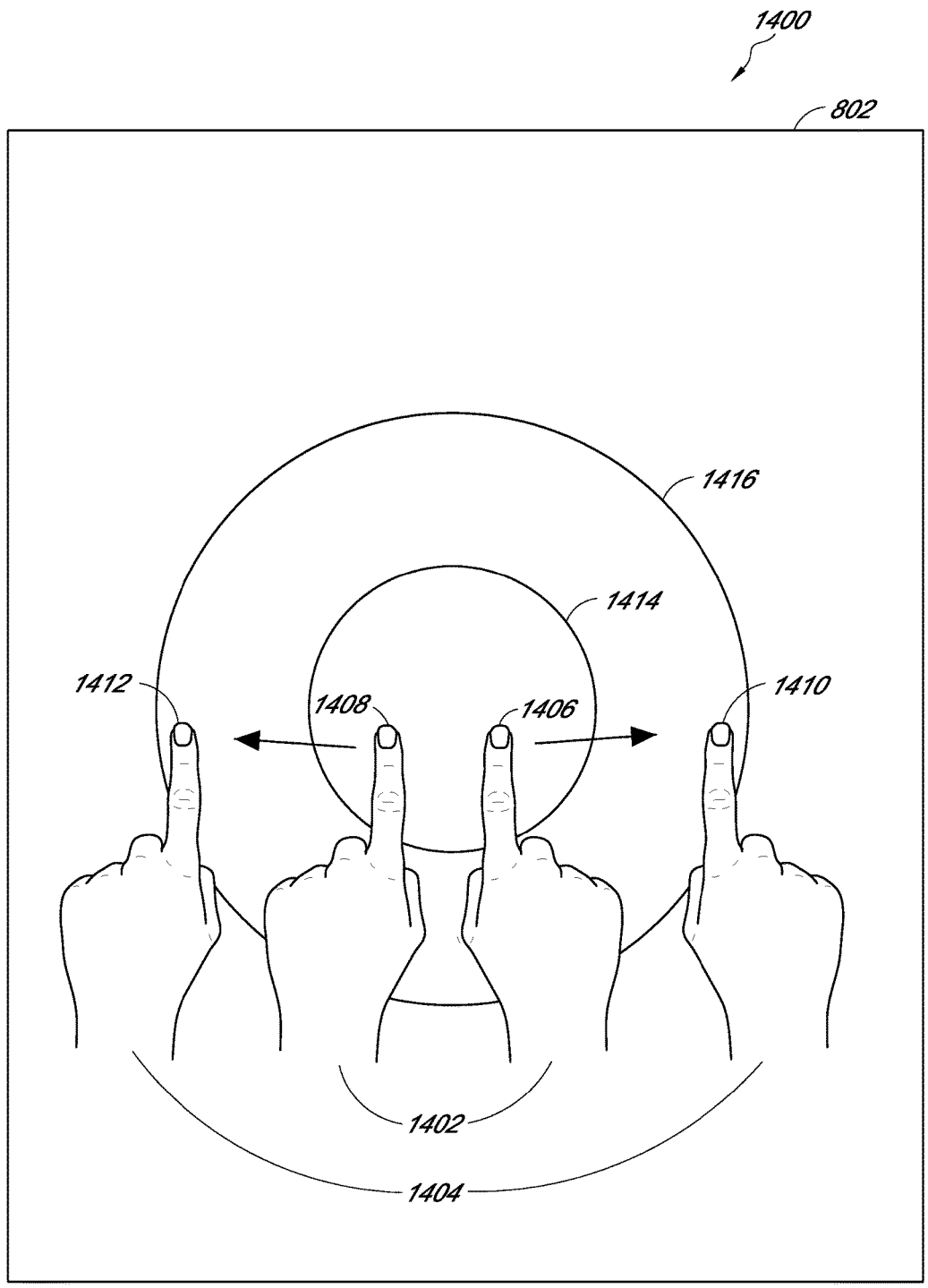
FIG. 14 illustrates an example of an occupant performing a pinching gesture beginning within the area of illumination and the resulting change in size of the area of illumination.

FIG. 14 is a drawing depicting an example embodiment of pinching control gesture 1400, according to some embodiments. The drawing is provided for the purpose of facilitating description of aspects of some embodiments. The drawing does not attempt to illustrate all aspects of the disclosure and should not be considered limiting.

FIG. 14 illustrates an example of pinching control gesture 1400. In some embodiments, a pinching gesture is performed when the occupant 1402 makes at least two points of contact between one or more appendages and display 802 within an area of illumination 1414, point of contact 1406 and point of contact 1408, and while maintaining contact with display 802, the occupant moves the one or more appendages in directions that are substantially away from each other or substantially closer together. The hardware processor 212 executes instructions 216 that cause the sensor interface 210 to receive input from sensor(s) 222 that is indicative of a gesture from the occupant 804 to control illumination within the vehicle. The hardware processor 212 executes instructions 216 to interpret the sensor input to determine an illumination control operation 218 associated with the occupant 804 performing a pinching gesture.

In some embodiments, the illumination control operation 218 associated with a pinching gesture is to change the size of an area of illumination 1414. In some embodiments, the area of illumination 1414 is increased in size when the occupant 1402 moves the appendages that are in contact with the display 802 in directions that are substantially away from each other. For example, the occupant 1402 can move the appendages forming point of contact 1406 and point of contact 1408 away from each other to the locations of new point of contact 1410 and new point of contact 1412. This can result in the area of illumination 1414 increasing to be the size of area of illumination 1416. Occupant 1404 is occupant 1402 at a later moment in time. In some embodiments, the increase in size is proportional to the new distance between new point of contact 1412 and new point of contact 1410. In some embodiments, the increase in size is proportional to the increase in distance between the new points of contact as compared against the distance between the points of contact before moving away from each other. In some embodiments, the increase in size is based on maintaining the outer perimeter of the area of illumination 1414 at a certain distance away from the point of contact between the appendages and display 802.

In some embodiments, the area of illumination 1414 is decreased in size when the occupant 1402 moves the appendages that are in contact with the display 802 in directions that are substantially toward each other. This can result in a smaller sized area of illumination. In some embodiments, the decrease in size is proportional to the new distance separating the points of contact made by the appendages of the occupant after moving towards each other. In some embodiments, the decrease in size is proportional to the decrease in distance separating the points of contact made by the appendages of the occupant after moving towards each other and the distance between the point of contact 1408 and point of contact 1406 before moving the appendages in contact with the display 802 towards each other. In some embodiments, the decrease in size is based on maintaining the outer perimeter of the area of illumination 1414 at a certain distance away from the points of contact between the occupant's appendages and the display 802.

Once an illumination control operation 218 associated with a pinching gesture is determined, the hardware processor 212 executes instructions 216 that cause the system to generate, via the display controller 204, display commands 206 configured to cause the display 802 to effectuate the illumination control operation 218 as disclosed herein.

As discussed, FIG. 14 illustrates an example embodiment of a pinching gesture control 1400. Other embodiments can include one or more other criteria described with reference to FIG. 14. Appendages can include limbs and/or digits of an occupant. Embodiments that may omit or add to one or more features to the example pinching gesture control 1400 of FIG. 14 are within the scope of this disclosure.

Figure 15:
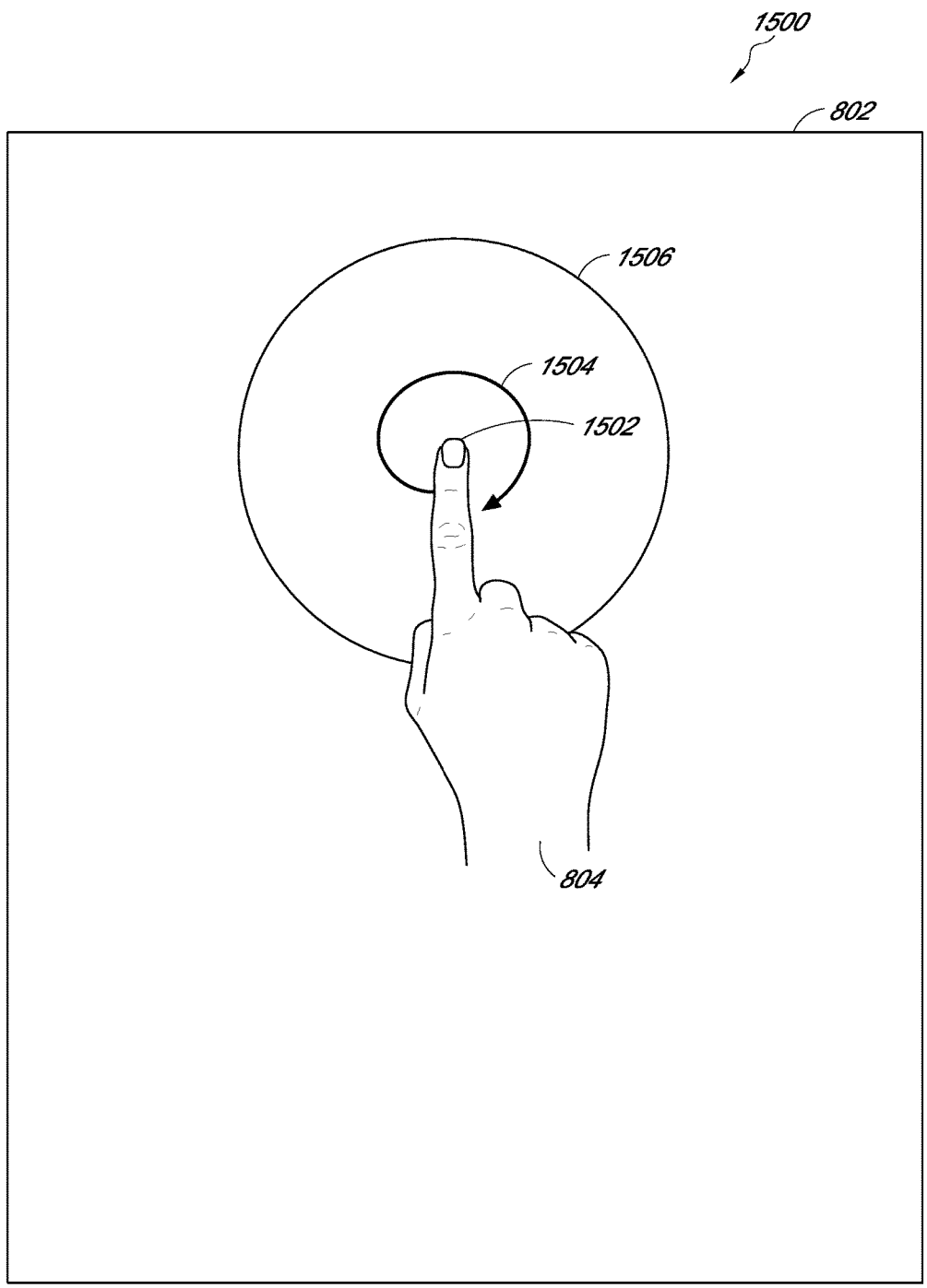
FIG. 15 illustrates an example of an occupant performing a rotation gesture within the area of illumination.

Example Rotation Gesture Changing the Color and/or Brightness of an Area of Illumination FIG. 15 is a drawing depicting an example embodiment of rotation control gesture 1500, according to some embodiments. The drawing is provided for the purpose of facilitating description of aspects of some embodiments. The drawing does not attempt to illustrate all aspects of the disclosure and should not be considered limiting.

FIG. 15 illustrates an example of rotation control gesture 1500. In some embodiments, a rotation gesture is performed when the occupant 804 makes a point of contact 1502 within an area of illumination 1506 between an appendage of the occupant 804 and the display 802, and while maintaining contact between the appendage and the display 802, moves the appendage in a circular motion 1504 within the area of illumination 1506. In some embodiments, a rotation gesture is performed when the occupant 804 makes multiple points of contact within an area of illumination 1506 between appendages of the occupant 804 and the display 802, and while maintaining contact between at least some of the appendages and the display 802, moves the appendages in a circular motion within the area of illumination 1506. The circular motion can be substantially circular. The circular motion can be a swirling motion. In some embodiments, a rotation gesture is performed when the occupant 804 makes a point of contact 1502 within an area of illumination 1506 between an appendage of the occupant 804 and the display 802, and while maintaining contact between the appendage and the display 802, rotates the appendage within the area of illumination 1506.

In some embodiments, the illumination control operation 218 associated with a rotation gesture 1304 is to change the brightness and/or color of the area of illumination 1506. In some embodiments, a clockwise circular motion and/or rotation of the appendage within the area of illumination 1506 causes the area of illumination to increase in brightness and a counterclockwise circular motion and/or rotation of the appendage within the area of illumination 1506 causes the area of illumination to decrease in brightness. In some embodiments, a clockwise circular motion and/or rotation of the appendage within the area of illumination 1506 causes the area of illumination to decrease in brightness and a counterclockwise circular motion and/or rotation of the appendage within the area of illumination 1506 causes the area of illumination to increase in brightness. In some embodiments, the color of the area of illumination 1506 is changed in response to the occupant 804 performing a rotation gesture. In some embodiments, a clockwise circular motion and/or rotation of the appendage will change the color. In some embodiments, a counterclockwise circular motion and/or rotation of the appendage will change the color.

Once an illumination control operation 218 associated with a rotation gesture is determined, the hardware processor 212 executes instructions 216 that cause the system to generate, via the display controller 204, display commands 206 configured to cause the display 802 to effectuate the illumination control operation 218 as disclosed herein.

As discussed, FIG. 15 illustrates an example embodiment of a rotation gesture control 1500. Other embodiments can include one or more other criteria described with reference to FIG. 15. Other gestures could be used to cause the system to change the color and/or brightness of an area of illumination. Embodiments that may omit or add to one or more features to the example rotation gesture control 1500 of FIG. 15 are within the scope of this disclosure.

Example Drawing Gesture with Illumination

Figure 16:
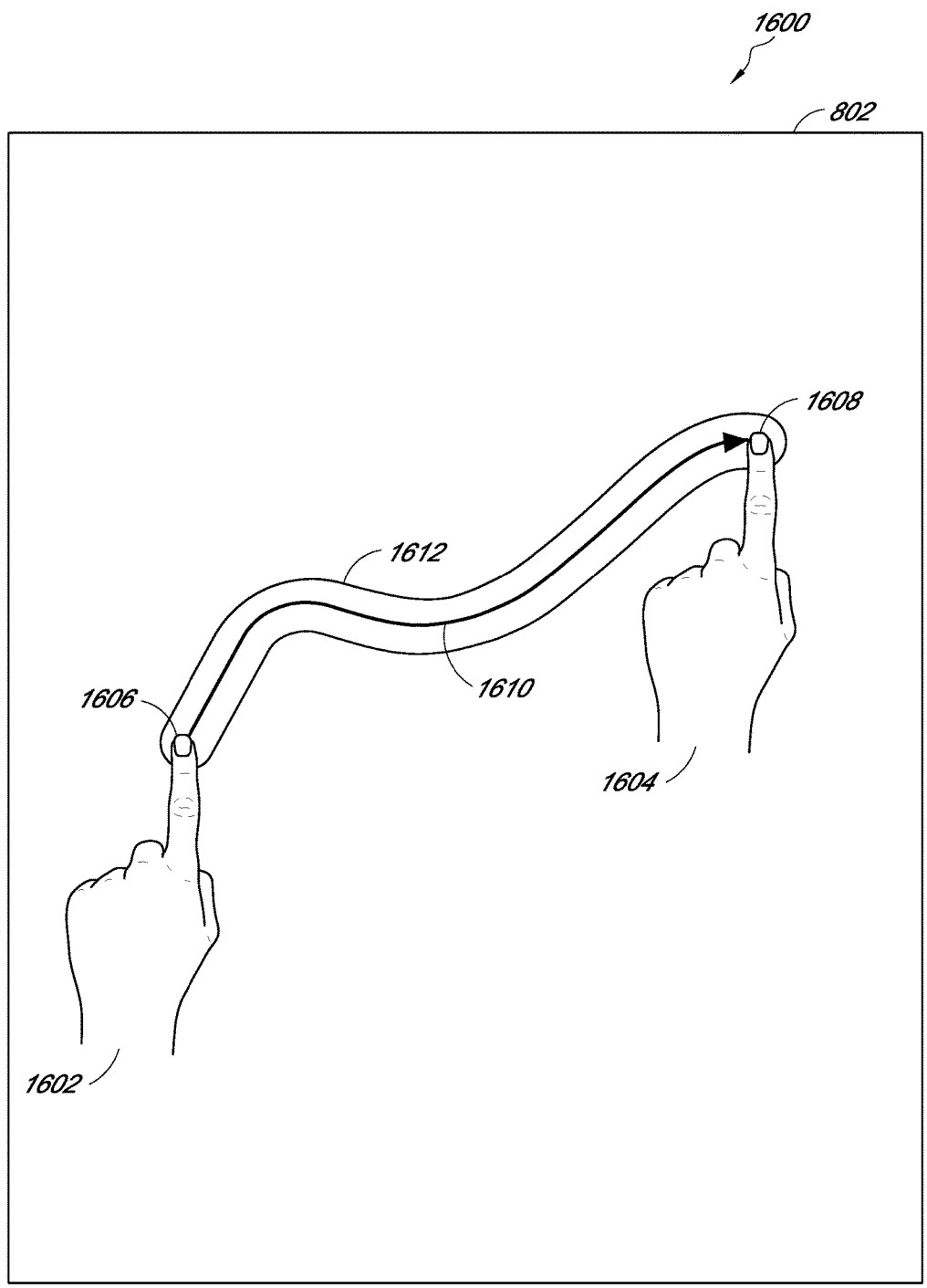
FIG. 16 illustrates an example of an occupant performing a drawing gesture and the resulting illumination.

FIG. 16 is a drawing depicting an example embodiment of drawing control gesture 1600, according to some embodiments. The drawing is provided for the purpose of facilitating description of aspects of some embodiments. The drawing does not attempt to illustrate all aspects of the disclosure and should not be considered limiting.

FIG. 16 illustrates an example of drawing control gesture 1600. In some embodiments, an occupant 1602 performs a drawing gesture when an appendage of occupant 1602 makes contact with the display 802 at a point of contact 1606 and, while maintaining contact between the display 802 and the appendage of occupant 1602, the occupant 1602 moves the appendage to a new point of contact 1608. In some embodiments, the route of the appendage in contact with the display 802 defines a trace path 1610. In some embodiments, the point of contact 1606 must not be within an area of illumination. The occupant 1604 is occupant 1602 at a later moment in time. The hardware processor 212 executes instructions 216 that cause the sensor interface 210 to receive input from sensor(s) 222 that is indicative of a gesture from the occupant 804 to control illumination within the vehicle. The hardware processor 212 executes instructions 216 to interpret the sensor input to determine an illumination control operation 218 associated with the occupant 804 performing a drawing gesture.

In some embodiments, the illumination control operation 218 associated with a drawing gesture is to illuminate the trace path 1610 to create an illuminated path 1612. In some embodiments, the trace path 1610 is illuminated to form the illuminated path 1612 as the occupant 1602 moves the appendage from the point of contact 1606 while maintaining contact with the display 802. In some embodiments, the trace path 1610 is illuminated to form the illuminated path 1612 once the occupant reaches new contact position 1608. In some embodiments, the illuminated path 1612 can have at least the same varying aspects as described herein for an area of illumination. In some embodiments, the illuminated path 1612 is centered on the trace path 1610. In some embodiments, the illuminated path 1612 is at a distance from the trace path 1610. In some embodiments, this method can be used by an occupant to free draw on the display 802. In some embodiments, this method can be used by an occupant to write illuminated text on the display 802.

Once an illumination control operation 218 associated with a drawing gesture is determined, the hardware processor 212 executes instructions 216 that cause the system to generate, via the display controller 204, display commands 206 configured to cause the display 802 to effectuate the illumination control operation 218 as disclosed herein.

As discussed, FIG. 16 illustrates an example embodiment of a drawing gesture control 1600. Other embodiments can include one or more other criteria described with reference to FIG. 16. Other gestures could be used to cause the system to create an illuminated path 1612. Embodiments that may omit or add to one or more features to the example drawing gesture control 1600 of FIG. 16 are within the scope of this disclosure.

Figure 17:
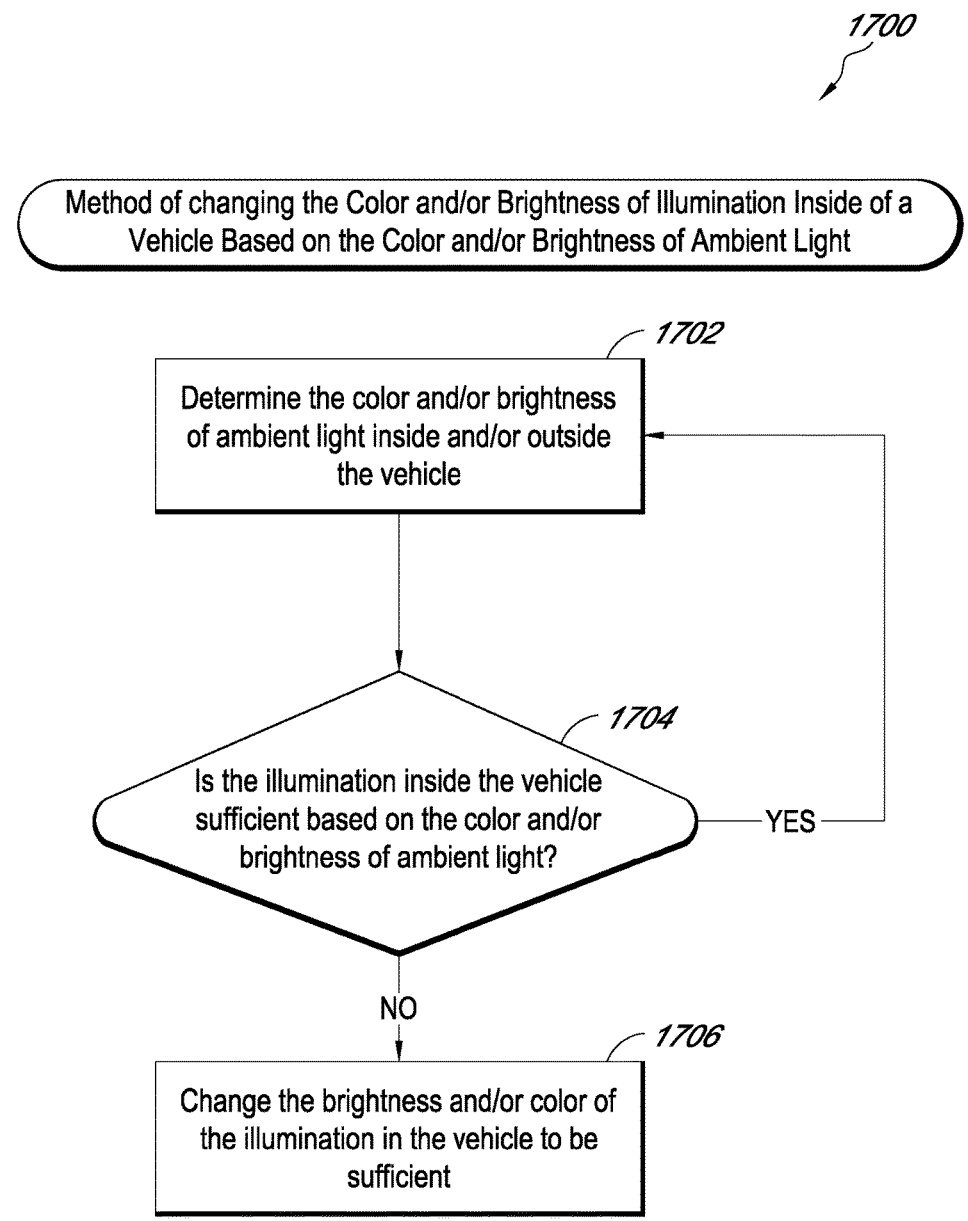
FIG. 17 illustrates an example of a method for changing the brightness and/or color of illumination inside of a vehicle based on the color and/or brightness of detected ambient light.

Example Method for Changing the Brightness and/or Color of Illumination Inside of a Vehicle Based on the Color and/or Brightness of Detected Ambient Light FIG. 17 is a flow diagram depicting an example method of changing the brightness and/or color of illumination inside of a vehicle based on the color and/or brightness of detected ambient light 1700, according to some embodiments. The flow diagram is provided for the purpose of facilitating description of aspects of some embodiments. The diagram does not attempt to illustrate all aspects of the disclosure and should not be considered limiting.

At block 1702, the system determines the color and/or brightness of ambient light inside and/or outside the vehicle. The system can detect the color and/or brightness of ambient light inside and/or outside the vehicle with at least one of the sensor(s) 222 described in reference to FIG. 2. In some embodiments, the system has sensor(s) 222 located on the interior and/or the exterior of the vehicle to sense ambient light, and the sensor interface 210, described in reference to FIG. 2, can receive input from the sensor(s) 222.

At block 1704, the system asks if the illumination inside of the vehicle is sufficient based on the detected color and/or brightness of ambient light. In some embodiments, the determination regarding whether the illumination is sufficient is determined by an algorithm stored in the memory system that has the color and/or brightness of ambient light as an input. In some embodiments, the sufficiency is determined by comparing the detected brightness and/or color of ambient light against a tabulation of desired and/or preferred levels of brightness and/or color of ambient light. In some embodiments, the determination regarding whether the illumination is sufficient based on the color and/or brightness of ambient light is determined in reference to manual occupant inputs. When the illumination inside of the vehicle is sufficient based on the detected color and/or brightness of ambient light, the system moves to block 1706. When the illumination inside of the vehicle is insufficient based on the detected color and/or brightness of ambient light, the system returns to block 1702

At block 1706, the system changes the brightness and/or color of the illumination in the vehicle to be sufficient, or otherwise appropriate for occupant comfort or occupant activity. In some embodiments, the system generates, via the display controller, display commands configured to change a brightness and/or color of the illumination based on the detected brightness and/or color of the detected ambient light such that it is sufficient. In some embodiments, the brightness and/or color of the illumination is changed by an algorithm stored in the memory system that has the color and/or brightness of ambient light as an input. In some embodiments, the change in brightness and/or color of the illumination is based on tabulated values. For example, if the brightness of ambient light inside the vehicle is 100% then the illumination inside the vehicle may be set to 100% brightness and a cool white color, or if the brightness of ambient light inside the vehicle is 0% then the illumination inside the vehicle may be set to 30% and a warm white color, or such as for a reading activity, if the brightness of ambient light inside the vehicle is 10% then the illumination inside the vehicle may be set to 90% and a warm white color. There are multiple ways in which the system can adjust the illumination based on detected ambient light.

As discussed, FIG. 17 illustrates an example embodiment of a method for changing the brightness and/or color of illumination inside of a vehicle based on the color and/or brightness of detected ambient light. Other embodiments can include one or more other criteria described with reference to FIG. 17 and/or other suitable criteria for accomplishing one or more objectives set forth in this disclosure. Such embodiments, which may omit or add to one or more the steps shown in the flow diagram of FIG. 17, are within the scope of this disclosure.

Example Method for Causing an Area of Illumination to Follow the Position of the Occupant of the Vehicle FIG. 18 is a flow diagram depicting an example method for causing an area of illumination to follow the position of the occupant of the vehicle 1800, according to some embodiments. The flow diagram is provided for the purpose of facilitating description of aspects of some embodiments. The diagram does not attempt to illustrate all aspects of the disclosure and should not be considered limiting.

At block 1802, the system determines that the occupant touched the display at a touch position. A touch position can be described as the touch position 806, point of contact, described in reference to FIG. 8 herein.

At block 1804, the system generates display commands that cause the display to provide an area of illumination at the touch position. This can be performed according to the description in reference to FIG. 2 and FIG. 8. The area of illumination can include one or more other aspects described in reference to the area of illumination 808 in FIG. 8.

At block 1806, the system determines the position of the occupant of the vehicle. In some embodiments, the system can determine the position of the occupant of the vehicle with at least one of the sensor(s) 222 described in reference to FIG. 2, and the sensor interface 210, described in reference to FIG. 2, can receive input from the sensor(s) 222. The system can determine the position of the occupant according to the description in reference to FIG. 3-7.

At block 1808, the system asks if the occupant has moved from the position to a new position. In some embodiments, the system can determine the position or new position of the occupant with the systems and/or methods described in reference to block 1806 or referred to in block 1806. When the occupant has moved from the position to a new position, the system moves to block 1810. When the occupant has not moved from the position to a new position, the system moves to block 1812.

At block 1810, the system moves the area of illumination generated at block 1804 to illuminate the new position of the occupant. In some embodiments, the area of illumination is moved to a position on the display that is directly over the occupant. In some embodiments, the area of illumination is moved to a position on the display that is some distance from the position that is directly over the occupant. In some embodiments, the area of illumination is moved to a position on the display that is above an appendage and/or limb of the occupant. The system then returns to block 1806.

At block 1812, the system does not move the area of illumination.

As discussed, FIG. 18 is a flow diagram depicting an example method for causing an area of illumination to follow the position of the occupant of the vehicle 1800. Other embodiments can include one or more other criteria described with reference to FIG. 18 and/or other suitable criteria for accomplishing one or more objectives set forth in this disclosure. Such embodiments, which may omit or add to one or more the steps shown in the flow diagram of FIG. 18, are within the scope of this disclosure.

Figure 19:
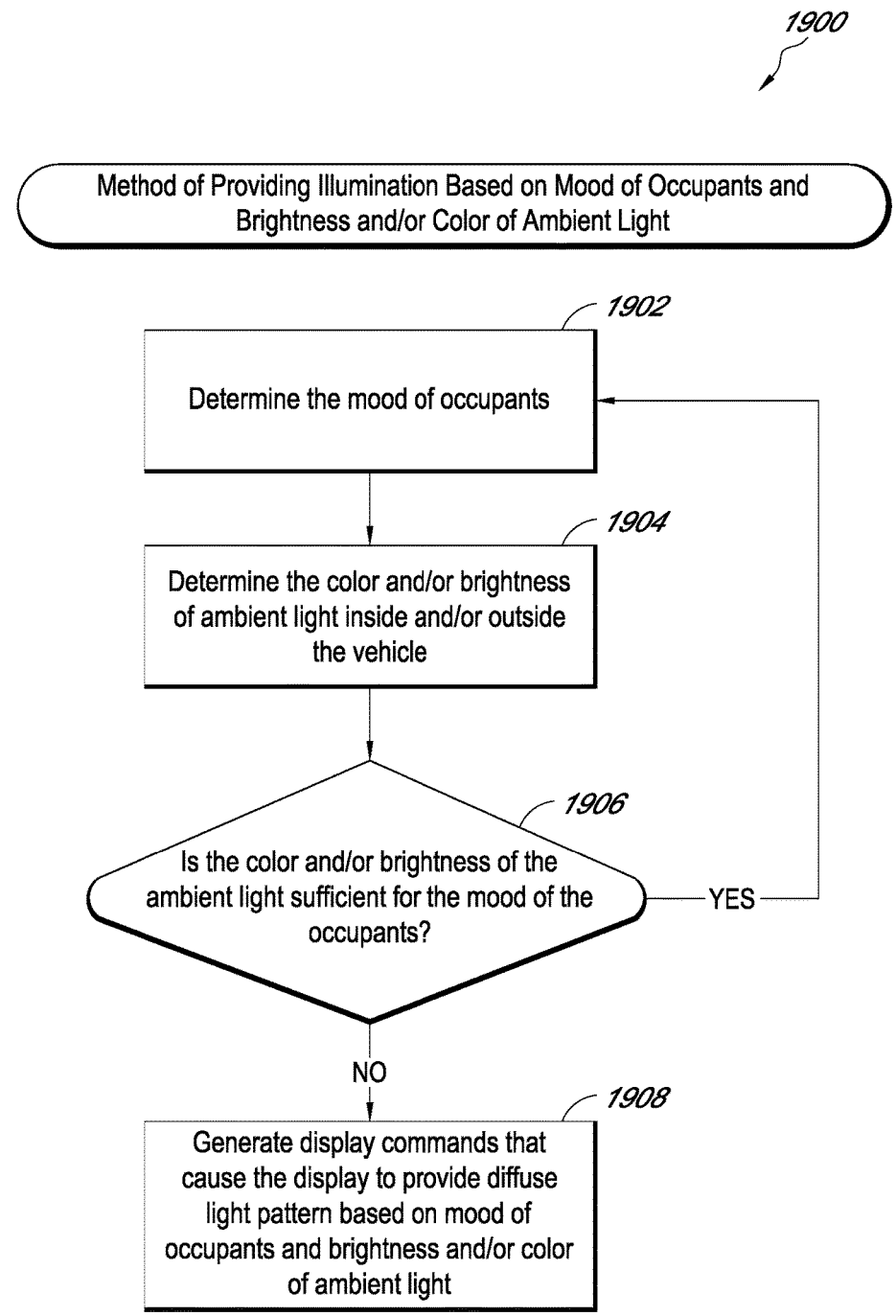
FIG. 19 illustrates an example of a method for providing illumination inside of a vehicle based on the mood of the occupants and brightness and/or color of ambient light.

Example Method for Providing Illumination Based on the Mood of Occupants and Brightness and/or Color of Ambient Light FIG. 19 is a flow diagram depicting an example method for providing illumination based on the mood of occupants of a vehicle and the brightness and/or color of ambient light inside and/or outside the vehicle 1900, according to some embodiments. The flow diagram is provided for the purpose of facilitating description of aspects of some embodiments. The diagram does not attempt to illustrate all aspects of the disclosure and should not be considered limiting.

At block 1902, the system determines the mood of the occupants of the vehicle. In some embodiments, the system can determine the mood of the occupants of the vehicle with at least one of the sensor(s) 222 described in reference to FIG. 2, and the sensor interface 210, described in reference to FIG. 2, can receive input from the sensor(s) 222. The system can determine the mood of the occupants according to the description in reference to FIG. 3-7 and/or according to any other technique that permits the system to ascertain enough information about the mood in order to determine that an illumination adjustment is appropriate. In some embodiments, determining the mood of the occupants can include sensing any music being played and/or sung in the vehicle with an audio sensor.

At block 1904, the system determines the color and/or brightness of ambient light inside and/or outside the vehicle. The system can accomplish this according to the description in reference to block 1702 of FIG. 17.

At block 1906, the system determines if the color and/or brightness of the ambient light inside and/or outside the vehicle is suitable and/or sufficient for the mood of the occupants. In some embodiments, the determination regarding whether the color and/or brightness of the ambient light inside and/or outside the vehicle is sufficient is determined by an algorithm stored in the memory system that has the detected color and/or brightness of ambient light determined in block 1904 and the detected mood of the occupants determined in block 1902 as inputs. In some embodiments, the determination regarding whether the color and/or brightness of ambient light is sufficient for detected mood of the occupant is determined in reference to manual occupant inputs. When the color and/or brightness of the ambient light inside and/or outside the vehicle is suitable and/or sufficient for the mood of the occupants, the system returns to block 1902. When the color and/or brightness of the ambient light inside and/or outside the vehicle is insufficient for the mood of the occupants, the system moves to block 1908.

At block 1908, the system generates display commands that cause the display to provide diffuse light pattern(s) based on the mood of the occupants and the brightness and/or color of ambient light inside and/or outside the vehicle. In some embodiments, the appropriate generated display commands can be determined by an algorithm stored in the memory system that has the detected mood of the occupants and the color and/or brightness of ambient light inside and/or outside the vehicle as inputs. In some embodiments, the diffuse light pattern can include the aspects of the diffuse light pattern described in reference to FIG. 21.

As discussed, FIG. 19 is a flow diagram depicting an example method for providing illumination based on the mood of occupants of a vehicle and the brightness and/or color of ambient light inside and/or outside the vehicle. Other embodiments can include one or more other criteria described with reference to FIG. 19 and/or other suitable criteria for accomplishing one or more objectives set forth in this disclosure. Such embodiments, which may omit or add to one or more the steps shown in the flow diagram of FIG. 19, are within the scope of this disclosure.

Example Method for Providing Illumination Based on Activity and Brightness and/or Color of Ambient Light FIG. 20 is a flow diagram depicting an example method for providing illumination based on the activity of the occupant of a vehicle and the brightness and/or color of ambient light inside and/or outside the vehicle 2000, according to some embodiments. The flow diagram is provided for the purpose of facilitating description of aspects of some embodiments. The diagram does not attempt to illustrate all aspects of the disclosure and should not be considered limiting.

At block 2002, the system determines the activity of the occupant of the vehicle. In some embodiments, the system can determine the activity of the occupant of the vehicle with at least one of the sensor(s) 222 described in reference to FIG. 2, and the sensor interface 210, described in reference to FIG. 2, can receive input from the sensor(s) 222. The system can determine the activity of the occupants according to the description in reference to FIG. 3-7 herein and/or according to any other technique that permits the system to ascertain enough information about the activity in order to determine that an illumination adjustment is appropriate.

At block 2004, the system asks if the detected activity requires an area of illumination. When the activity does not require an area of illumination, the system returns to block 2002. When the activity does require an area of illumination, the system moves to the block 2006.

At block 2006, the system determines the brightness and/or color of ambient light inside and/or outside. In some embodiments, the system can determine the brightness and/or color of ambient light inside and/or outside the vehicle according to the description in reference to block 1702 of FIG. 17.

At block 2008, the system asks if the brightness and/or color of ambient light inside and/or outside the vehicle is sufficient and/or suitable for the activity. In some embodiments, the determination regarding whether the brightness and/or color of ambient light inside and/or outside the vehicle is sufficient is determined by an algorithm stored in the memory system that has the detected color and/or brightness of ambient light determined in block 1904 and the detected activity determined in block 2002 as inputs. In some embodiments, the determination regarding whether the brightness and/or color of ambient light inside and/or outside the vehicle is sufficient is based on the detected color and/or brightness of ambient light and the detected activity of the occupant in reference to manual occupant inputs. When the color and/or brightness of the ambient light inside and/or outside the vehicle is sufficient for the activity of the occupants, the system returns to block 2002. When the color and/or brightness of the ambient light inside and/or outside the vehicle is insufficient and/or unsuitable for the activity of the occupants, the system moves to block 2010.

At block 2010, the system generates commands that cause the display to provide an area of illumination with a size, shape, brightness, color, and position based on the activity and brightness and/or color of ambient light inside and/or outside the vehicle. In some embodiments, the appropriate generated display commands can be determined by an algorithm stored in the memory system that has the detected activity of the occupants and the color and/or brightness of ambient light inside and/or outside the vehicle as inputs. The area of illumination can include one or more other aspects described in reference to the area of illumination 808 in FIG. 8.

In some embodiments, reading a book is a recognized activity of the system. Accordingly, upon the system recognizing that the occupant is reading a book, the system steps through the blocks of FIG. 20 to determine whether or not an area of illumination should be provided. If the system determines that an area of illumination should be provided, the system will provide one according to the disclosure provided herein.

As discussed, FIG. 20 is a flow diagram depicting an example method for providing illumination based on the activity of the occupant of a vehicle and the brightness and/or color of ambient light inside and/or outside the vehicle 2000. Other embodiments can include one or more other criteria described with reference to FIG. 20 and/or other suitable criteria for accomplishing one or more objectives set forth in this disclosure. Such embodiments, which may omit or add to one or more the steps shown in the flow diagram of FIG. 20, are within the scope of this disclosure.

Example Active Ceiling Display System Providing Diffuse Light Patterns

Figure 21:
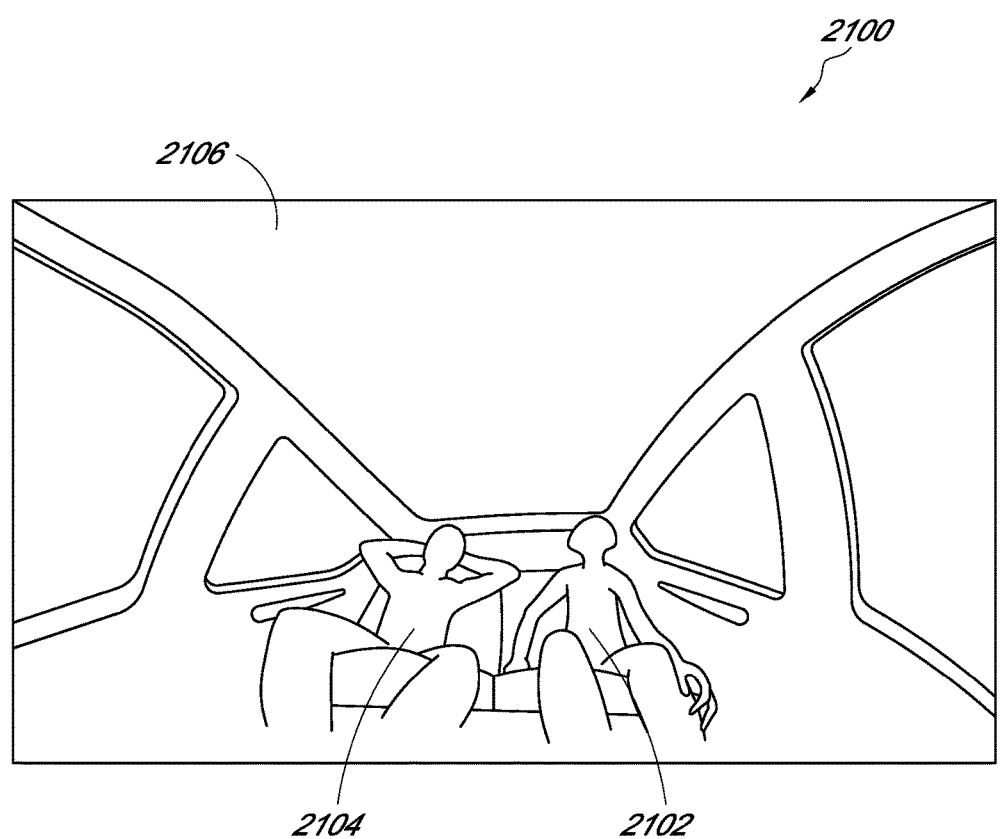
FIG. 21 illustrates an example of an active ceiling display system providing a diffuse light pattern.

FIG. 21 is a drawing depicting an example diffuse light pattern configuration 2100, according to some embodiments. The drawing is provided for the purpose of facilitating description of aspects of some embodiments. The drawing does not attempt to illustrate all aspects of the disclosure and should not be considered limiting.

FIG. 21 illustrates an example of diffuse light pattern 2100. In some embodiments, diffuse light patterns are displayed on display 2106. In some embodiments, the system generates display commands that cause the display 2106 to provide diffuse light pattern(s) based on weather, sky color and/or ambient light outside the vehicle. The diffuse light pattern can include any color or brightness. The diffuse light pattern can include moving aspects. The diffuse light pattern can include images and/or video. The diffuse light pattern can include any shape. In some embodiments, an area of illumination, such as area of illumination 808 of FIG. 8, disappears when occupants 2104 and 2102 are inactive and the system causes display 2106 to display a diffuse light pattern. In some embodiments, the system determines that the occupants 2102, 2104 are resting and/or otherwise engaged in an activity that does not require illumination and, in response to that determination, generates a display signal that causes the display 2106 to create a diffuse light pattern 2100 in the vehicle cabin. One or more of the example methods described with references to FIG. 19 or 20 can be used to sense the mood or activity of the vehicle's occupants. In addition, the diffuse light pattern can be changed by the methods described in reference to FIG. 17 and FIG. 19.

As discussed, FIG. 21 illustrates an example embodiment of diffuse light pattern configuration 2100. Other embodiments can include one or more other criteria described with reference to FIG. 21. Embodiments that may omit or add to one or more features to the example diffuse light pattern configuration 2100 of FIG. 21 are within the scope of this disclosure.

Terminology

Many different gestures are described herein, such as dragging gestures, pinching gestures, tapping gestures, etc. Other gestures can be substituted to facilitate performing each of the methods disclosed herein. Further, many gestures are described herein that involve making contact with a display, but gestures that do not require contact with the display may be substituted. For example, a pointing gesture, involving an occupant pointing at a location on the display, could be associated with an illumination control operation that causes an area of illumination to appear at the The "color" of light is referred to throughout the disclosure herein. The "color" of light can refer to the "temperature" of light.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Language of example or capability used herein, such as, among others, "can," "could," "might," "may," "e.g.," "some," "certain," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown and described features as applied to various example embodiments, omissions, substitutions, additions, and changes in the form and details of the devices or algorithms described can be made without departing from the spirit of the disclosure. Certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for providing occupant-controlled illumination inside of a vehicle, the system comprising:
    a display interface configured to operatively connect to a display disposed on a ceiling of the vehicle;
    a display controller connected to the display interface, the display controller configured to generate electronically-encoded display instructions that cause the display to provide illumination inside of the vehicle;
    a sensor interface configured to operatively connect to a sensor, wherein the sensor is configured to sense a location of an occupant of the vehicle; and
    a hardware processor connected to a physical memory system comprising instructions that, when executed by the hardware processor, cause:
        (i) the sensor interface to receive sensor input from the sensor that is indicative of a gesture from the occupant of the vehicle to control the illumination within the vehicle;
        (ii) the hardware processor to interpret the sensor input to determine an illumination control operation associated with the gesture; and
        (iii) the display controller to generate display commands to cause the display to effectuate the illumination control operation.

2. The system of claim 1, wherein the instructions of the physical memory system, when executed by the hardware processor, cause:
    the hardware processor to determine that the occupant touched the display at a touch position; and
    in response to determining that the occupant touched the display, the display controller to generate the display commands to cause the display to provide an area of illumination at the touch position.

3. The system of claim 2, wherein the area of illumination is an oval.

4. The system of claim 2, wherein the instructions of the physical memory system, when executed by the hardware processor, to cause:
    the hardware processor to determine that the occupant tapped the display at the area of illumination; and
    in response to determining that the occupant tapped the display at the area of illumination, the display controller to generate the display commands to change a shape of the area of illumination.

5. The system of claim 2, wherein the instructions of the physical memory system, when executed by the hardware processor, cause:
    the hardware processor to determine that the occupant double-tapped the display at the area of illumination; and
    in response to determining that the occupant double-tapped the display at the area of illumination, the display controller to generate the display commands to cause the area of illumination to have a rectangular shape.

6. The system of claim 2, wherein the instructions of the physical memory system, when executed by the hardware processor, cause:
    the hardware processor to determine that the occupant triple-tapped the display at the area of illumination; and
    in response to determining that the occupant triple-tapped the display at the area of illumination, the display controller to generate the display commands to cause the area of illumination to have a triangular shape.

7. The system of claim 2, wherein the instructions of the physical memory system, when executed by the hardware processor, cause:
    the hardware processor to determine that the occupant performed a dragging gesture beginning within the area of illumination and ending at a new touch position; and
    in response to determining that the occupant performed the dragging gesture beginning within the area of illumination, the display controller to generate the display commands to cause the area of illumination to move to the new touch position.

8. The system of claim 7, wherein the display commands cause the area of illumination to follow the dragging gesture of the occupant.

9. The system of claim 2, wherein the instructions of the physical memory system, when executed by the hardware processor, cause:
    the hardware processor to determine that the occupant performed a flicking gesture beginning within the area of illumination and having a flick direction; and in response to determining that the occupant performed the flicking gesture beginning within the area of illumination, the display controller to generate the display commands to cause the area of illumination to move in the flick direction.

10. The system of claim 9, wherein the instructions of the physical memory system, when executed by the hardware processor, cause:
the hardware processor to determine a flick speed of the flicking gesture; and
the display controller to generate the display commands to move the area of illumination by a movement distance proportional to the flick speed.

11. The system of claim 2, wherein the instructions of the physical memory system, when executed by the hardware processor, cause:
the hardware processor to determine that the occupant performed a pinching gesture beginning within the area of illumination; and
in response to determining that the occupant performed the pinching gesture beginning within the area of illumination, the display controller to generate the display commands to change a size of the area of illumination.

12. The system of claim 2, wherein the instructions of the physical memory system, when executed by the hardware processor, cause:
the hardware processor to determine that the occupant performed a rotation gesture within the area of illumination; and
in response to determining that the occupant performed the rotation gesture within the area of illumination, the display controller to generate the display commands to change a color and/or brightness of the area of illumination.

13. The system of claim 1, wherein the instructions of the physical memory system, when executed by the hardware processor, cause:
the hardware processor to determine that the occupant performed a drawing gesture creating a trace path; and
in response to determining that the occupant performed the drawing gesture creating the trace path, the display controller to generate the display commands to illuminate the trace path.

14. The system of claim 1, wherein the sensor is configured to sense ambient light inside and/or outside the vehicle, and wherein the instructions of the physical memory system, when executed by the hardware processor, cause:
the hardware processor to determine a brightness of ambient light inside and/or outside the vehicle; and
in response to determining the brightness of ambient light inside and/or outside the vehicle, the display controller to generate the display commands to change a brightness of an area of illumination.

15. The system of claim 1, wherein the sensor is configured to sense ambient light inside and/or outside the vehicle; and wherein the instructions of the physical memory system, when executed by the hardware processor, cause:
the hardware processor to determine a color of ambient light inside and/or outside the vehicle; and
in response to determining the color of ambient light inside and/or outside the vehicle, the display controller to generate the display commands to change a color of illumination.

16. The system of claim 1, wherein the display is comprised of a flexible mesh of light-emitting diodes operatively connected to a roof of the vehicle.

17. The system of claim 1, wherein the sensor is configured to sense the location of the occupant and one or more limbs or appendages of the occupant of the vehicle with at least two sensors.

18. The system of claim 2, wherein the instructions of the physical memory system, when executed by the hardware processor, cause:
in response to determining that the occupant touched the display, the hardware processor to determine an initial position of the occupant; and
the hardware processor to determine that the occupant has moved from the initial position to a new position within the vehicle; and
in response to determining that the occupant has moved to the new position, the display controller to generate the display commands to move the area of illumination such that the area of illumination illuminates the new position.

19. The system of claim 1, wherein the instructions of the physical memory system, when executed by the hardware processor, cause the display controller to generate the display commands cause the display to provide a diffuse light pattern.

20. The system of claim 1, wherein the instructions of the physical memory system, when executed by the hardware processor, cause:
the hardware processor to determine that the occupant is not secured by a seatbelt; and
in response to determining that the occupant is not secured by the seatbelt, the display controller to generate the display commands to cause the display to provide an alert.

21. The system of claim 1, wherein the instructions of the physical memory system, when executed by the hardware processor, cause the hardware processor to:
determine a second location of a second occupant of the vehicle;
distinguish the second occupant from the occupant; and
associate the illumination to the occupant.

* * * * *

UNITED STATES PATENT AND TRADEMARK OFFICE
CERTIFICATE OF CORRECTION

PATENT NO. : 10,434,940 B1
APPLICATION NO. : 16/259493
DATED : October 8, 2019
INVENTOR(S) : Oscar Eduardo Verduzco Ochoa Page 1 of 1

It is certified that error appears in the above-identified patent and that said Letters Patent is hereby corrected as shown below:

In the Claims

In Column 28, Line 21, Claim 4, after "processor," delete "to".

In Column 30, Line 36, Claim 19, after "commands" insert --to--.

Signed and Sealed this
Seventeenth Day of November, 2020

Andrei Iancu
*Director of the United States Patent and Trademark Office*